United States Patent
Mimura

(10) Patent No.: US 8,201,953 B2
(45) Date of Patent: Jun. 19, 2012

(54) CUBE CORNER TYPE RETROREFLECTION ARTICLE

(75) Inventor: Ikuo Mimura, Uozu (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 444 days.

(21) Appl. No.: 12/303,257

(22) PCT Filed: Jun. 6, 2007

(86) PCT No.: PCT/JP2007/061846
§ 371 (c)(1),
(2), (4) Date: Jul. 6, 2009

(87) PCT Pub. No.: WO2007/142356
PCT Pub. Date: Dec. 13, 2007

(65) Prior Publication Data
US 2009/0296216 A1    Dec. 3, 2009

(30) Foreign Application Priority Data

| Jun. 6, 2006 | (JP) | 2006-157252 |
| Jun. 16, 2006 | (JP) | 2006-166894 |
| Jun. 4, 2007 | (JP) | 2007-147681 |
| Jun. 4, 2007 | (JP) | 2007-147682 |
| Jun. 4, 2007 | (JP) | 2007-147683 |
| Jun. 4, 2007 | (JP) | 2007-147684 |

(51) Int. Cl.
*G02B 5/126* (2006.01)
(52) U.S. Cl. ........................ 359/530; 359/534
(58) Field of Classification Search .......... 359/529–535, 359/546–568
See application file for complete search history.

(56) References Cited

U.S. PATENT DOCUMENTS

| 2,310,790 A | 2/1943 | Jungersen |
| 5,022,739 A | 6/1991 | Bennett |
| 5,132,841 A | 7/1992 | Bennett |
| 5,138,488 A | 8/1992 | Szczech |
| 5,175,645 A | 12/1992 | Bennett |
| 5,706,132 A | 1/1998 | Nestegard |
| 5,889,615 A | 3/1999 | Dreyer |
| 5,898,523 A | 4/1999 | Smith |
| 5,936,770 A | 8/1999 | Nestegard |
| 6,036,322 A | 3/2000 | Nilsen |

(Continued)

FOREIGN PATENT DOCUMENTS

EP     0137736     4/1985

(Continued)

*Primary Examiner* — Jennifer L. Doak
(74) *Attorney, Agent, or Firm* — Fitzpatrick, Cella, Harper & Scinto

(57) ABSTRACT

A retroreflection article formed of groups of grooves in three directions having substantially V-shaped cross sections, including a large number of pairs of cube corner retroreflection elements being disposed, the elements in each pair being formed to be rotationally symmetric while sharing one base line forming the retroreflection elements. A group of parallel V-shaped grooves in one direction (grooves x) forming the group of pairs of retroreflection elements has straight-line bottom tracks, the groups of parallel V-shaped grooves in the other two directions (grooves w1 and w2) have continuous bent-line bottom tracks bent at intersection points with the grooves x, the bottom tracks of the groups of parallel V-shaped grooves in the two directions (grooves w1 and w2) do not intersect with each other, and projection geometries of base planes (A-B-E1-D1 and A-B-E2-D2) forming the retroreflection elements are quadrilaterals.

20 Claims, 16 Drawing Sheets

U.S. PATENT DOCUMENTS

| | | | |
|---|---|---|---|
| 6,083,607 A | 7/2000 | Mimura | |
| 6,136,416 A | 10/2000 | Smith et al. | |
| 6,390,629 B1 | 5/2002 | Mimura | |
| 6,883,921 B2 | 4/2005 | Mimura | |
| 7,670,013 B2 * | 3/2010 | Mimura | 359/534 |
| 2002/0051292 A1 | 5/2002 | Mimura et al. | |
| 2007/0109641 A1 * | 5/2007 | Mimura | 359/530 |

FOREIGN PATENT DOCUMENTS

| | | |
|---|---|---|
| EP | 0548280 | 9/1994 |
| JP | 11305017 | 11/1999 |
| JP | 11305018 | 11/1999 |
| WO | 9818028 | 4/1998 |
| WO | 00/60385 | 10/2000 |
| WO | WO 2005054909 A1 * | 6/2005 |

* cited by examiner (a) PRIOR ART (b) PRIOR ART (c) PRIOR ART (a)

(b)

(c)

CUBE CORNER TYPE RETROREFLECTION ARTICLE

TECHNICAL FIELD

The present invention relates to a retroreflection article optimal for traffic signs and commercial signs. Specifically, the invention relates to a retroreflection article formed of groups of grooves in three directions having substantially V-shaped cross sections, including a large number of pairs of cube corner retroreflection elements being disposed, the elements in each pair being formed to be rotationally symmetric while sharing one base line forming the retroreflection elements. A group of parallel V-shaped grooves in one direction (grooves x) forming the group of pairs of retroreflection elements has straight-line bottom tracks, the groups of parallel V-shaped grooves in the other two directions (grooves w1 and w2) have continuous bent-line bottom tracks bent at intersection points with the grooves x, the bottom tracks of the groups of parallel V-shaped grooves in the two directions (grooves w1 and w2) do not intersect with each other, projection geometries of base planes forming the retroreflection elements are quadrilaterals (A-B-E1-D1 and A-B-E2-D2), and the article offers excellent retroreflective performance at night.

More specifically, the invention relates to a retroreflection article having an excellent wide angle property and improved entrance angularity, observation angularity, and rotation angularity.

BACKGROUND ART

Triangular pyramidal cube corner retroreflection elements have excellent retroreflective performance and are suitably used for a retroreflection article such as a traffic sign.

Conventionally, some proposals have been made in relation to a retroreflection article having excellent wide angle performance which has improved entrance angularity, observation angularity, and rotation angularity.

Many proposals are known and various improvements have been considered since a long time ago in relation to improvement of entrance angularities or observation angularities of such cube corner retroreflection sheet and retroreflection article and particularly triangular pyramidal cube corner retroreflection sheet and retroreflection article. Many of these techniques improve the entrance angularity by inclining optic axes of retroreflection elements.

For example, the U.S. Pat. No. 2,310,790 to Jungersen describes mounting of retroreflection elements in various shapes on a thin sheet. Examples of the triangular pyramidal reflective element mentioned in this U.S. Patent include a triangular pyramidal reflective element with its vertex located at a center of its base plane triangle and its optic axis not inclined and having a regular triangular base plane, and a triangular pyramidal reflective element with its vertex not located at a center of its base plane triangle and having an isosceles triangular base plane. In this U.S. Patent, there is a description of efficient reflection of light to an approaching automobile (improvement of the entrance angularity).

Moreover, the size of the triangular pyramidal reflective element is described as a 1/10 inch (2,540 μm) deep or less. Furthermore, FIG. 15 of the U.S. Patent illustrates a pair of triangular pyramidal reflective elements with their optic axes inclined in plus (+) directions (described later) and an inclination angle (θ) of the optic axes is estimated at about 6.5° from a ratio between lengths of a long side and a short side of a base plane isosceles triangle of the illustrated triangular pyramidal reflective element.

The European Patent No. 137,736B1 to Hoopman describes a retroreflection sheet and a retroreflection article where pairs of inclined triangular pyramidal cube corner retroreflection elements having isosceles triangular base planes are arranged on a thin sheet with their base planes on a common plane in a close-packed state and with the elements of each pair turned around 180° with respect to each other. Optic axes of the triangular pyramidal cube corner retroreflection elements described in this patent are inclined in minus (−) directions described in the present specification and an inclination angle is described as being about 7° to 13°.

Furthermore, the U.S. Pat. No. 5,138,488 to Szczech similarly discloses a retroreflection sheet and a retroreflection article where inclined triangular pyramidal cube corner retroreflection elements having isosceles triangular base planes are arranged on a thin sheet with their base planes on a common plane in a close-packed state. In this U.S. Patent, optic axes of the triangular pyramidal reflective elements are inclined toward a side shared by the two triangular pyramidal reflective elements facing each other and making a pair, i.e., in the plus (+) directions (described later) and the Patent specifies that an inclination angle is about 2° to 5° and that a size of the element is 25 μm to 100 μm.

Described in the European Patent No. 548,280B1 corresponding to the above patent are that a distance between a plane which includes the side shared by the two elements making the pair and which is perpendicular to the common plane and a vertex of the element is not equal to a distance between an intersection point of the optic axis of the element and the common plane and the perpendicular plane, that the inclination angle of the optic axis is about 2° to 5°, and that the size of the element is 25 μm to 100 μm.

As described above, in the European Patent No. 548,280B1 to Szczech, the inclination of the optic axis is in a range of about 2° to 5° in both the plus (+) and minus (−) directions. However, the above-described U.S. Patent and the European Patent to Szczech disclose, as embodiments, only the triangular pyramidal reflective elements 87.5 μm in height (h) and having inclination angles of the optic axes of (−)8.2°, (−)9.2°, and (−) 4.3°.

However, with the above-described technique of improving the entrance angularity and the observation angularity, the rotation angularity cannot be improved.

Various proposals have been made with the aim of improving the rotation angularity. In each of the proposals, orientations of retroreflection elements having triangular base planes in various divided zones are combined to improve the rotation angularity.

For example, there are the U.S. Pat. No. 5,022,739, the U.S. Pat. No. 5,132,841, the U.S. Pat. No. 5,175,645 by Bennett, et al., the U.S. Pat. No. 6,036,322 by Nilsen, et al., the U.S. Pat. No. 5,706,132, the U.S. Pat. No. 5,936,770 by Nestegard, et al., the U.S. Pat. No. 5,898,523 by Smith, and the like.

Although these patents are different in shapes of the divided zones of the elements and orientations of the triangular pyramidal cube corner elements, they are the same in their basic techniques where the retroreflection elements are formed by groups of V-shaped parallel grooves in three directions.

Furthermore, as disclosed in the U.S. Pat. No. 6,883,921B2 to Mimura, there are known retroreflection elements including a retroreflection element disclosed in the present invention and having a projection geometry of a base plane similar to an isosceles trapezoid. However, in the retroreflection elements described in this invention, two cube corner retroreflection elements, i.e., a tetrahedral retroreflection element having a quadrilateral (isosceles trapezoidal) projection geometry and a triangular pyramidal retroreflection element having an isosceles triangular projection geometry are formed to always make a pair by means of the groups of V-shaped parallel grooves in three directions. Moreover, the isosceles triangular cube corner retroreflection element has a disadvantage that it is inferior to the quadrilateral cube corner retroreflection element in reflection efficiency.

Also disclosed in the U.S. Pat. No. 6,083,607 to Mimura is a triangular pyramidal cube corner retroreflection element where the V-shaped grooves in three directions and forming the element have different depths. The retroreflection element disclosed in this patent has a triangular base plane.

DISCLOSURE OF THE INVENTION

Objects of the present invention are to provide a retroreflection element having excellent wide angle characteristic and improvement of entrance angularity, observation angularity, and rotation angularity.

In particular, it is an object to provide a retroreflection article having excellent rotation angularity as well as excellent entrance angularity and observation angularity.

As examples of specific application, it is an object to provide a retroreflection article that can be used for a traffic sign, a construction sign, a commercial sign, a vehicle license plate, vehicle reflective tape, a roadside reflector, a reflector of an optical sensor, a safety apparel, and the like.

Moreover, it is an object to provide a thin and flexible retroreflection sheet that can be used for the traffic sign, the construction sign, the commercial sign, the vehicle license plate, and the like. This retroreflection sheet has an excellent rotation angularity and therefore can be cut in any directions and used for the signs. The retroreflection sheet can be used for other various purposes.

Specific approaches to achieving the objects of the invention will be described below in detail.

A retroreflection article according to the invention is a retroreflection article formed of a group of a large number of pairs of cube corner retroreflection elements, the elements in each pair being substantially symmetric while sharing one baseline. A group of pairs of retroreflection elements is formed of a group of parallel V-shaped grooves (x) having substantially symmetric V-shaped cross sections and straight-line bottom tracks and groups of parallel V-shaped grooves (w1 and w2) having substantially symmetric V-shaped cross sections and bent-line bottom tracks. Projection geometries of base planes forming the retroreflection elements are quadrilaterals (A-B-E1-D1 and A-B-E2-D2). A height (hx) from vertexes (H1, H2) of the reflective elements to base lines of the V grooves of the group (x) of parallel V-shaped grooves having straight-line bottom tracks is different from a height (hw) from vertexes (H1, H2) of the retroreflection elements to base lines of the V grooves of the groups (w1 and w2) of parallel V-shaped grooves having bent-line bottom tracks, the groups of grooves forming the group of pairs of retroreflection elements.

More specifically, a ratio (hx/hw) between the height (hx) from vertexes (H1, H2) of the reflective elements to base lines of the V grooves of the group (x) of parallel V-shaped grooves having straight-line bottom tracks and the height (hw) from vertexes (H1, H2) of the retroreflection elements to base lines of the V grooves of the groups (w1 and w2) of parallel V-shaped grooves having bent-line bottom tracks is 1.05 to 1.4 and preferably 1.1 to 1.3, the groups of grooves forming the group of pairs of retroreflection elements.

A retroreflection article according to the invention relates to a retroreflection article formed of groups of grooves in three directions having substantially V-shaped cross sections, including a large number of pairs of cube corner retroreflection elements being disposed, the elements in each pair being formed to be rotationally symmetric while sharing one base line forming the retroreflection elements. A group of parallel V-shaped grooves in one direction (grooves x) forming the group of pairs of retroreflection elements has straight-line bottom tracks, the groups of parallel V-shaped grooves in the other two directions (grooves w1 and w2) have continuous bent-line bottom tracks bent at intersection points with the grooves x, and the bottom tracks of the groups of parallel V-shaped grooves in the two directions (grooves w1 and w2) do not intersect with each other. In at least one of the groups of V-shaped grooves, a one-side groove angle is not equal to the other one-side groove angle of the V-shaped groove, the one-side groove being an angle between a line segment and a V groove vertical plane perpendicular to a common plane and including a base line of the V-shaped groove and the line segment being formed by an intersection of a plane perpendicular to both the common plane and the V groove vertical plane, and a reflective side face including the base line of the V-shaped groove. Projection geometries of base planes forming the retroreflection elements are quadrilaterals (A-B-E1-D1 and A-B-E2-D2).

Specifically, the article relates to a retroreflection article formed of groups of grooves in three directions having substantially V-shaped cross sections, including a large number of pairs of cube corner retroreflection elements being disposed, and the elements in each pair being formed to be rotationally symmetric while sharing one base line forming the retroreflection elements. A group of parallel V-shaped grooves in one direction (grooves x) forming the group of pairs of retroreflection elements has straight-line bottom tracks, the groups of parallel V-shaped grooves in the other two directions (grooves w1 and w2) have continuous bent-line bottom tracks bent at intersection points with the grooves x, and the bottom tracks of the groups of parallel V-shaped grooves in the two directions (grooves w1 and w2) do not intersect with each other. In at least one of the groups of V-shaped grooves, a one-side groove angle changes in one reflective side face and the one reflective side face forms a curved face and/or a plurality of planes, the one-side groove being an angle between a line segment and a V groove vertical plane perpendicular to a common plane and including a base line of the V-shaped groove and the line segment being formed by an intersection of a plane perpendicular to both the common plane and the V groove vertical plane and the reflective side face including the base line of the V-shaped groove. Projection geometries of base planes forming the retroreflection elements are quadrilaterals (A-B-E1-D1 and A-B-E2-D2).

More specifically, the invention is a retroreflection article formed of groups of grooves in three directions having substantially V-shaped cross sections, including a large number of pairs of cube corner retroreflection elements being disposed, the elements in each pair being formed to be rotationally symmetric while sharing one base line forming the retroreflection elements. A group of parallel V-shaped grooves in one direction (grooves x) forming the group of pairs of retroreflection elements has straight-line bottom tracks, the groups of parallel V-shaped grooves in the other two directions (grooves w1 and w2) have continuous bent-line bottom tracks bent at intersection points with the grooves x, and the bottom tracks of the groups of parallel V-shaped grooves in the two directions (grooves w1 and w2) do not intersect with each other. Where an angle between C1-A and A-B is rA1, an angle between A-B and B-C1 is rB1, and an angle between B-C1 and C1-A is rC1, rA1, rB1, and rC1 are substantially different from each other. Projection geometries of base planes forming the retroreflection elements are quadrilaterals (A-B-E1-D1 and A-B-E2-D2).

A retroreflection article according to the invention is a retroreflection article formed of groups of grooves in three directions having substantially V-shaped cross sections, including a large number of pairs of cube corner retroreflection elements being disposed, the elements in each pair being formed to be rotationally symmetric while sharing one base line forming the retroreflection elements. A group of parallel V-shaped grooves in one direction (grooves x) forming the group of pairs of retroreflection elements has straight-line bottom tracks, the groups of parallel V-shaped grooves in the other two directions (grooves w1 and w2) have continuous bent-line bottom tracks bent at intersection points with the grooves x, and the bottom tracks of the groups of parallel V-shaped grooves in the two directions (grooves w1 and w2) do not intersect with each other. The group of pairs of elements includes a first zone and a second zone and an angle between a line x1 and a line x2 is 5 to 175° where the groups of V-shaped grooves in the direction x in the first zone are the lines x1 and the groups of V-shaped grooves in the direction x in the second zone are the lines x2. Projection geometries of base planes forming the retroreflection elements form quadrilaterals (A-B-E1-D1 and A-B-E2-D2).

The pairs of retroreflection elements forming the retroreflection article of the invention are formed by cutting the grooves having the V-shaped cross sections in three directions.

The V-shaped grooves in one direction are formed of a group of parallel V-shaped grooves (grooves x) having substantially symmetric V-shaped cross sections and straight-line bottom tracks.

The V-shaped grooves in the other two directions are formed of groups two kinds of parallel V-shaped grooves (grooves w1 and w2) having substantially symmetric V-shaped cross sections and bent-line bottom tracks. The groups of two kinds of parallel V-shaped grooves (grooves w1 and w2) are parallel at equal intervals and formed in the same direction, though they are out of phase with each other.

In other words, the bottom tracks of the groups of parallel V-shaped grooves (grooves w1 and w2) are formed so as not to intersect with each other.

It is an object of the invention to provide, without using the above-described conventionally known methods, a retroreflection article formed of groups of parallel V-shaped grooves (x, x, x . . . , w1, w1, w1 . . . , and w2, w2, w2 . . . ) in three directions (directions x, w1, and w2), the article being formed of a group of a large number of pairs of triangular pyramidal cube corner retroreflection elements disposed on a common plane (S-S') determined by a group of base lines of the groups of parallel V-shaped grooves. Among one-side groove angles (GLx, GRx, GLw1, GRw1, GLw2 and GRw2) each of which is an angle between a line segment and a V groove vertical plane (Svx, Svw1 or Svw2) perpendicular to the common plane (S-S') and including a base line of the V-shaped groove, the line segment being formed by an intersection of a plane perpendicular to both the common plane (S-S') and the V groove vertical plane and a reflective side face (a1, b1, c1, a2, b2, or c2) including the base line of the V-shaped groove, a one-side groove angle between one of the retroreflection side faces formed by at least one V groove and the normal to an element base plane at a bottom portion of the V-shaped groove is not equal to the other one-side groove angle (GLx and GRx, GLW1 and GRw1, GLw2 and GRw2).

Regular reflective side faces mentioned in the invention refer to reflective side faces in relationships of theoretical cube corner reflective side faces in which three reflective side faces are substantially perpendicular to each other in a cube corner retroreflection element. Furthermore, a regular one-side groove angle means a groove angle that is necessary to form a regular retroreflection element.

It is an object of the invention to selectively improve retroreflection performance at a target observation angle by forming a group of pairs of retroreflection elements so that the one-side groove angle (GLx, GRx, GLw1, GRw1, GLw2, GRw2) has a maximum deviation of 0.0001 to 0.1° from a regular one-side groove angle forming a cube corner in a reflective side face having a V-shaped groove (groove x, w1, or w2) in at least one direction as its base line, the groove forming the pair of triangular pyramidal cube corner retroreflection elements.

According to the invention, the above objects are achieved by providing a retroreflection article formed of groups of parallel V-shaped grooves (x, x, x . . . , w1, w1, w1 . . . , and w2, w2, w2) in three directions (direction x, direction w1, and direction w2), the article being formed of a group of a large number of pairs of triangular pyramidal cube corner retroreflection elements disposed on a common plane (S-S') determined by a group of base lines of the parallel V-shaped grooves. A one-side groove angle (GLx, GRx, GLw1, GRw1, GLw2, or GRw2) has a maximum deviation of 0.0001 to 0.1° from a regular one-side groove angle forming a cube corner, the one-side groove angle being an angle between a line segment and a V groove vertical plane (Svx, Svw1 or Svw2) perpendicular to the common plane (S-S') and including a base line of the V-shaped groove, the line segment being formed by an intersection of a plane perpendicular to both the common plane (S-S') and the V groove vertical plane and a reflective side face (a1, b1, c1, a2, b2, or c2) including the base line of the V-shaped groove intersecting each other.

Projection geometries of base planes of the cube corner retroreflection elements formed by the V-shaped grooves in the two directions form quadrilaterals (A-B-E1-D1 and A-B-E2-D2), the elements being formed as a substantially symmetric pair of elements sharing longer base lines of the quadrilaterals as a common base line of the elements and facing each other.

In the invention, the bent-line shape is a shape in which certain lengths of straight lines are joined continuously and cyclically at certain angles. Although each junction may be bent sharply without a curved-line portion, the straight lines joined by certain curved-line portions are more suitable for machining a die for forming the retroreflection article according to the invention. As a specific size of the curved-line portion, a radius of the curved line may be 5 to 50 µm, for example.

The retroreflection article in the invention can be formed, according to conventionally known methods, by using a molding die having a recessed shape obtained by inverting the retroreflection elements and by a method such as compression molding, injection molding, injection compression molding, and cast molding. The recessed molding die can be prepared by preparing a protruding die by a V-shaped groove forming method by a conventionally known method such as fly cutting, finish cutting, shaping, ruling, milling, and pressing and then inverting the protruding die by electroforming. Although the bent-line portions of the bent lines forming the groups of V-shaped grooves (grooves w1 and w2) form curved-line shapes and do not form reflective side faces, the other group of V-shaped grooves (grooves x) cuts off most areas and therefore the retroreflective performance is hardly reduced.

In the invention, the substantially symmetric V-shaped groove is a V-shaped groove having such an angle that the retroreflective performance of the cube corner retroreflection elements formed by the V-shaped grooves can obtain such accuracy as to able to obtain target retroreflection brightness of a retroreflection product.

It is an object of the invention to improve three angle characteristics and especially observation angularity by an easy method without using the above-described conventionally known methods by forming a retroreflection article formed of groups of parallel V-shaped grooves (x, x, x . . . , w1, w1, w1 . . . , and w2, w2, w2 . . . ) in three directions (directions x, w1, and w2), the article being formed of the group of a large number of pairs of triangular pyramidal cube corner retroreflection elements disposed on a common plane (S-S') determined by a group of base lines of the group of parallel V-shaped grooves. A one-side groove angle (GLx, GRx, GLw1, GRw1, GLw2, or GRw2) is not constant in a reflective side face and the reflective side face forms a curved face and/or a plurality of planes, the one-side groove being an angle between a line segment and a V groove vertical plane (Svx, Svw1, or Svw2) perpendicular to the common plane (S-S') and including a base line of the V-shaped groove and the line segment being formed by an intersection of a plane perpendicular to both the common plane (S-S') and the V groove vertical plane and the reflective side face (a1, b1, c1, a2, b2, or c2) including the base line of the V-shaped groove.

Regular reflective side faces mentioned in the invention refer to reflective side faces in relationships of theoretical cube corner reflective side faces in which three reflective side faces are substantially perpendicular to each other in a cube corner retroreflection element. Furthermore, a regular one-side groove angle means a groove angle that is necessary to form a regular retroreflection element.

It is an object of the invention to selectively improve retroreflective performance at a target observation angle by forming a group of a large number of pairs of triangular pyramidal cube corner retroreflection elements, in which, in a reflective side face having as its base line a V-shaped groove (groove x, w1, or w2) in at least one direction and forming the pair of triangular pyramidal cube corner retroreflection elements, the one-side groove angle (GLx, GRx, GLw1, GRw1, GLw2, GRw2) is not constant while having a maximum deviation of 0.0001 to 0.1° from a regular one-side groove angle forming a cube corner and the reflective side face forms a curve face and/or a plurality of planes.

According to the invention, the above objects are achieved by providing a retroreflection article formed of groups of parallel V-shaped grooves (x, x, x . . . , w1, w1, w1 . . . , and w2, w2, w2 . . . ) in three directions (directions x, w1, and w2), the article being formed of a group of a large number of pairs of triangular pyramidal cube corner retroreflection elements disposed on a common plane (S-S') determined by a group of base lines of the parallel V-shaped grooves. A one-side groove angle (GLx, GRx, GLw1, GRw1, GLw2, or GRw2) is not constant in the reflective side face and does not form a plane, the one-side groove angle being an angle between a line segment and a V groove vertical plane (Svx, Svw1 or Svw2) perpendicular to a common plane (S-S') and including a base line of the V-shaped groove, the line segment being formed by an intersection of a plane perpendicular to both the common plane (S-S') and the V groove vertical plane and the reflective side face (a1, b1, c1, a2, b2, or c2) including the base line of the V-shaped groove.

It is further an object of the invention to improve three angle characteristics and especially observation angularity by an easy method without using the above-described conventionally known methods by forming a retroreflection article formed of groups of V-shaped grooves (x, x, x . . . , w1, w1, w1 . . . , and w2, w2, w2 . . . ) disposed at equal intervals in three directions, the article being formed of a group of a large number of pairs of triangular pyramidal cube corner retroreflection elements disposed on a common plane (S-S') determined by a group of base lines of the V-shaped grooves. The base line forming the V-shaped groove in any direction in the pairs of retroreflection elements is a nonlinear base line that does not have a straight-line track and the reflective side face formed by the V-shaped groove forms a curved face and/or a plurality of planes.

It is another object of the invention to selectively improve retroreflective performance at a target observation angle by using a retroreflection article formed of a group of a large number of pairs of triangular pyramidal cube corner retroreflection elements, in which a nonlinear factor (fx, fy, or fz) is 0.0001L to 0.05L, the nonlinear factor being defined by a maximum distance between a point where a perpendicular line and the nonlinear base line intersect each other and an opposite-end straight line connecting both ends of the nonlinear base line, the perpendicular line being from the opposite-end straight line to the nonlinear base line, and L being a length of the opposite-end straight line.

Regular reflective side faces mentioned in the invention refer to reflective side faces in relationships of theoretical cube corner reflective side faces in which three reflective side faces are substantially perpendicular to each other in a cube corner retroreflection element. Furthermore, a regular one-side groove angle means a one-side groove angle of the V-shaped groove that is necessary to form a regular retroreflection element. Moreover, the nonlinear base line means a base line forming the reflective side face and not having a straight-line track. The reflective side face having such a base line does not form a plane but forms a multifaceted reflective side face formed of quadric surfaces, cubic surfaces, or a combination thereof or a multifaceted reflective side face formed of a plurality of planes.

A further preferable retroreflection article of the invention is a retroreflection article in which three internal angles rA1, rB1 and rC1 of the retroreflection element are substantially different from each other and an internal angle rmax that is the largest internal angle among the three internal angles rA1, rB1, and rC1 is 63°≦rmax≦88°.

In the retroreflection device including a first zone and a second zone with an angle between a line x1 in the first zone and a line x2 in the second zone being 5 to 175° and preferably 80 to 100°, it is possible to make entrance angularities in the horizontal direction, the vertical direction, and the direction between them uniform by combining the respective zones.

The retroreflection device may include three or more zones. By combining the respective zones while dividing the angles so that the angles which the lines x of the respective zones make become uniform in all directions, it is possible to make the entrance angularities in the horizontal direction, the vertical direction, and the direction between them more uniform.

The cube corner retroreflection element used in the invention can employ an optic axis with a large inclination angle and therefore can have excellent entrance angularity. In the conventionally known retroreflection element, differences between areas of three reflective side faces (faces a1, b1, c1 and faces a2, b2, c2) forming the element increase as inclination of an optic axis increases and therefore retroreflection efficiency reduces. In the retroreflection element in the invention, on the other hand, such reduction in the reflection efficiency can be suppressed and therefore the inclination angle of the optic axis may be plus (+) 3° or greater.

The inclination angle of the optic axis of the retroreflection element in the invention is preferably plus (+) 5° to 20° and more preferably (+) 7° to 12°. Even if the optic axis is inclined at such a large angle, unlike the conventionally known triangular pyramidal cube corner retroreflection element, differences between areas of three reflective side faces (faces a1, b1, c1 and faces a2, b2, c2) forming the element are small and therefore it is possible to minimize the reduction in the retroreflection efficiency.

Furthermore, where a distance between two base lines (A-B, D1-E1 and A-B, D2-E2) forming the quadrilateral base plane of the retroreflection element is r and a distance between an intersection point (C1 and C2) of extended lines of the other oblique sides (A-D1, B-E1 and A-E2, B-D2) and the base line (A-B) is s, a ratio (R) between the distance r and the distance s $$R = r/s \quad \text{(Expression 1)}$$

is preferably 0.4 to 0.95. By adjusting the ratio (R) to 0.4 to 0.95 and preferably 0.5 to 0.9, it is possible to suppress the differences between the areas of the three reflective side faces (faces a1, b1, c1 and faces a2, b2, c2) forming the element.

In this way, the retroreflection efficiency of the cube corner retroreflection element according to invention having the quadrilateral base plane formed by cutting off the vertexes (C1 and C2) of the conventionally known isosceles triangular pyramidal cube corner retroreflection element along the base lines (D1-E1, D2-E2) is hardly changed from the retroreflection efficiency of the triangular pyramidal cube corner retroreflection element before the cutting off.

According to the invention, it is possible to provide a retroreflection article having excellent wide angle characteristic, i.e., excellent entrance angularity, improved observation angularity and rotation angularity.

A height (hx) from vertexes (H1, H2) of the reflective elements to base lines of the V grooves of the group (x) of parallel V-shaped grooves having straight-line bottom tracks is different from a height (hw) from vertexes (H1, H2) of the retroreflection elements to base lines of the V grooves of the groups (w1 and w2) of parallel V-shaped grooves having bent-line bottom tracks, the groups of grooves forming the group of pairs of retroreflection elements.

A ratio (hx/hw) between the height (hx) and the height (hw) in the invention is preferably 1.05 to 1.4 and more preferably 1.1 to 1.3.

In this way, in the plus-inclined reflective elements according to the invention, it is possible to form deeper V-shaped grooves in the direction x than in the direction w1 or w2 to thereby increase areas of the reflective side faces (faces c1 and c2) including the common base line (A-B) and therefore the retroreflection efficiency is further improved. Preferably, the areas are substantially equal to areas of the other reflective side faces (faces a1, b1 and faces a2, b2).

On the other hand, in the minus-inclined reflective elements, it is possible to form shallower grooves in the direction x to thereby reduce excessively large areas of reflective side faces (faces c1 and c2) including the common base line (A-B) and therefore the retroreflection efficiency is further improved.

BEST MODES FOR CARRYING OUT THE INVENTION

Preferred embodiments of a multidirectional retroreflection article according to the present invention will be described below with reference to the drawings.

Figure 1:
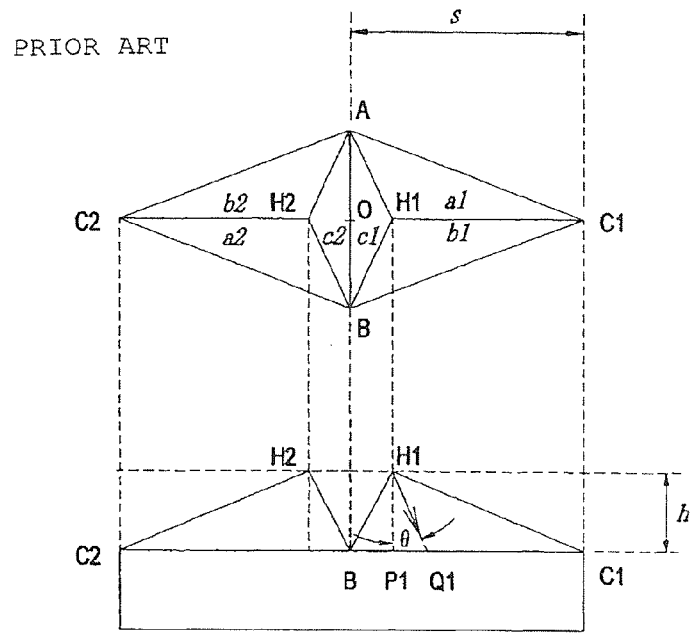
FIG. 1 shows a conventional pair of triangular pyramidal cube corner elements.

FIG. 1 shows a conventional pair of triangular pyramidal cube corner retroreflection elements. The retroreflection elements have triangular base planes (A-C1-B and A-C2-B) which share one base line (A-B) and have symmetric shapes to each other. Therefore, heights (h) from vertexes (H1 and H2) to the base planes of the two opposed elements are equal.

Optic axes in such retroreflection elements are defined as axes at equal distances from three reflective side faces (faces a1, b1, c1, and faces a2, b2, c2). By inclining these optic axes with respect to the normals (H1-P1) from vertexes to the base planes (A-C1-B and A-C2-B), it is possible to enhance retroreflection efficiency of lights coming from directions of the inclination. Such technique of improving the retroreflective property in the directions of the incident angles, i.e., improving the entrance angularity, by inclining the optic axes is well known.

Such inclination angle (θ) of the optic axis can be in the plus direction or the minus direction. In the invention, the inclination is defined as the inclination in the plus direction when a difference (p−q) between a distance (p) and a distance (q) is positive while the inclination is defined as the inclination in the minus direction when the difference (p−q) is negative, the distance (p) being the distance between a midpoint (O) of the base line (A-B) and an intersection point (P1) of the vertex (H1) and the base plane (A-C1-B) and the distance (q) being the distance between the midpoint (O) of the base line (A-B) and an intersection point (Q1) of the optic axis and the base plane (A-C1-B).

Figure 2:
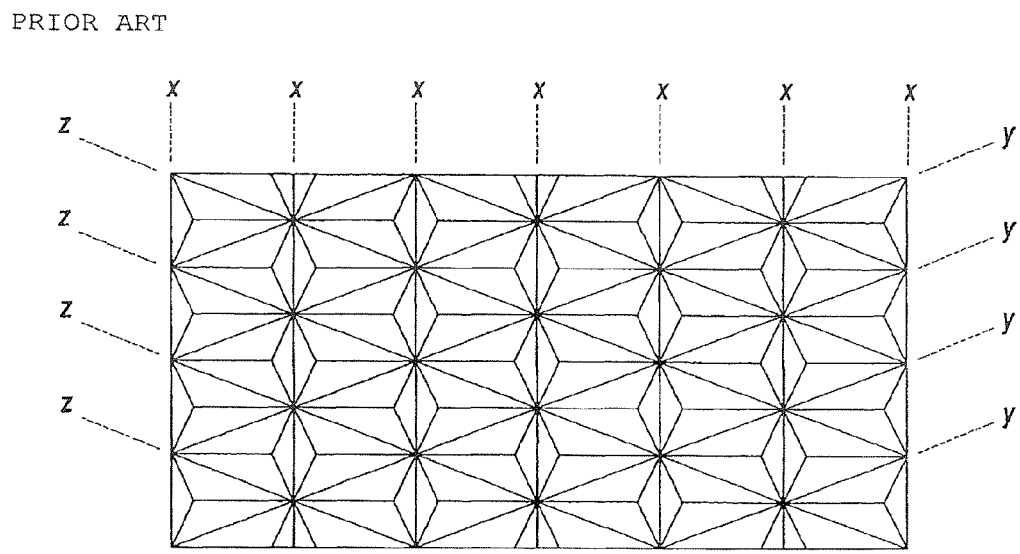
FIG. 2 shows a conventional group of triangular pyramidal cube corner elements.

FIG. 2 shows a group of retroreflection elements where the conventionally known pairs of triangular pyramidal cube corner retroreflection elements shown in FIG. 1 are set in a close-packed state while the elements of each pair share the base line. Such a group of retroreflection elements are formed by groups of parallel grooves in three directions (x, y, and z) having V-shaped cross sections. V angles of the V-shaped grooves in the three directions are determined so that the three reflective side faces (faces a1, b1, c1, and faces a2, b2, c2) of the retroreflection element are formed perpendicularly. A track of bottom portions of the V-shaped grooves substantially forms a straight line and adjacent V-shaped grooves in the same direction are parallel and arranged with a regular pitch.

The retroreflective performance of the retroreflection element having the inclined optic axis is not changed much due to change in the entrance angularity and the element is excellent in the entrance angularity. However, if the optic axis is inclined excessively, the retroreflective performance particularly in a front direction, i.e., in a direction where the incident angle is small is impaired.

Figure 3:
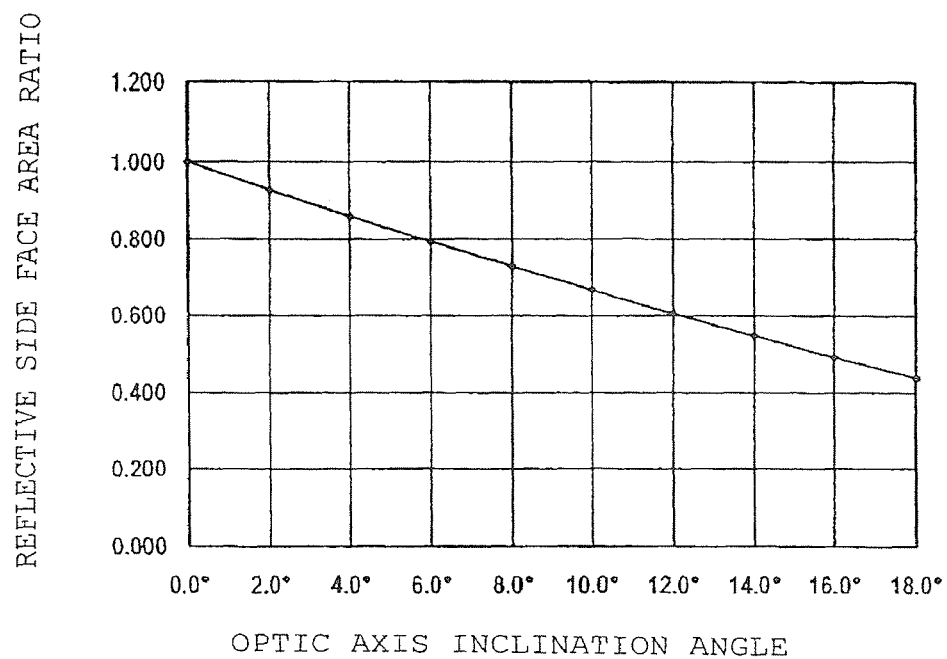
FIG. 3 shows a relationship between an optic axis inclination angle and a reflective side face area ratio.

FIG. 3 shows a relationship between an inclination angle (θ) of an optic axis of the retroreflection element inclined in the plus direction and a ratio between areas of two reflective side faces (a, c). For example, an area of the reflective side face (face c) of the retroreflection element having the optic axis inclined at +12° is only 60% an area of the other reflective side face (face a). To retroreflect light, the cube corner retroreflection element needs to reflect the light three times by the three reflective side faces (the faces a1, b1, c1, and the faces a2, b2, c2). If differences between areas of the reflective side faces of the retroreflection element are excessively large, the retroreflection efficiency reduces. Moreover, in the plus-inclined retroreflection element that is deformed excessively and stretching in a direction toward the vertex (C1), the retroreflection side faces (the faces a1, b1, and the faces a2, b2) near the vertex (C1) do not effectively contribute to retroreflection.

In other words, only parts of the reflective side faces of the triangular pyramidal cube corner retroreflection elements having the optic axes inclined greatly in the plus directions can contribute to the retroreflection and areas near the vertexes (C1, C2) do not contribute to the retroreflection.

Figure 4:
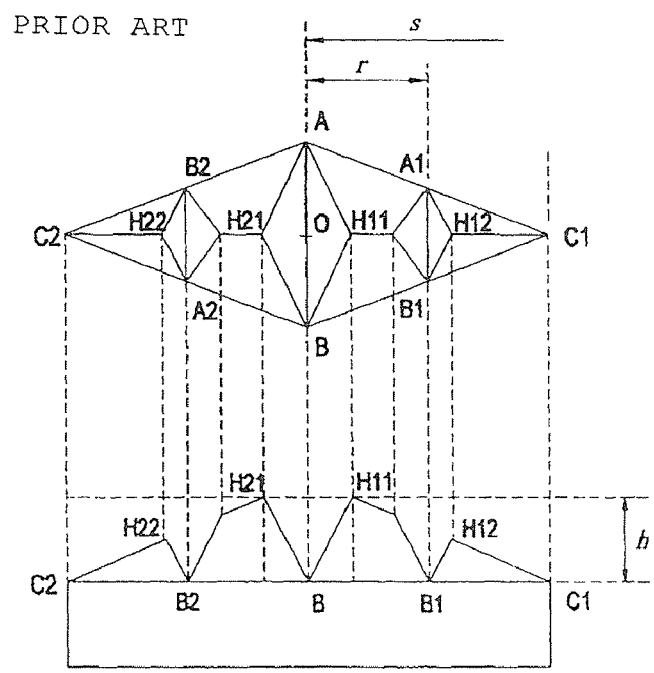
FIG. 4 shows a conventional pair of cube corner retroreflection elements.

FIG. 4 shows a conventionally known retroreflection elements where a V-shaped groove (A1-B1) is formed to be parallel to the groove in the A-B direction, passing through a midpoint between the midpoint (O) of the base line (A-B) and the vertex (C1), and parallel to the base line A-B in order to rectify the weakness of the retroreflection element inclined excessively in the plus direction as described above.

Figure 5:
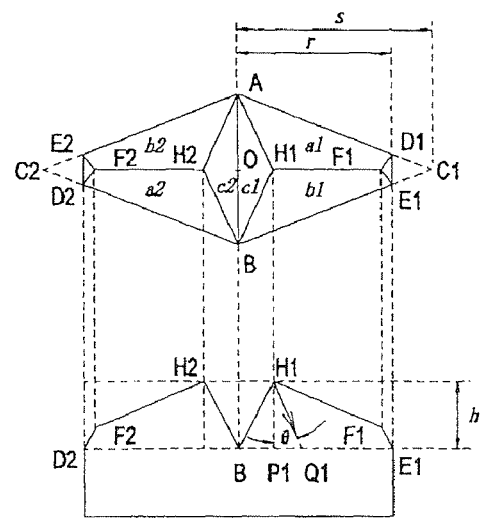
FIG. 5 shows a pair of cube corner retroreflection elements in the present invention.

The retroreflection elements shown in FIG. 5 are formed by cutting off, with V-shaped grooves, one vertexes (C1, C2) of base planes of the conventionally known triangular pyramidal cube corner retroreflection elements having the same optic axis inclination angle (θ) and element height (h). The vertexes (C1, C2) of the base planes are positioned at the intersection points of extended lines of two base lines (A-D1, B-E1, and A-E2, B-D2) forming a quadrilateral base plane of the invention.

If a distance between two base lines (A-B and E1-D1 or A-B and E2-D2) forming the quadrilateral base plane of the retroreflection element shown in FIG. 5 is r and a distance between the intersection point (C1 or C2) of extended lines of the other oblique sides (A-D1, B-E1 or A-E2, B-D2) and the base line (A-B) is s, a ratio (R=r/s) between the distance r and the distance is 0.8.

Figure 6:
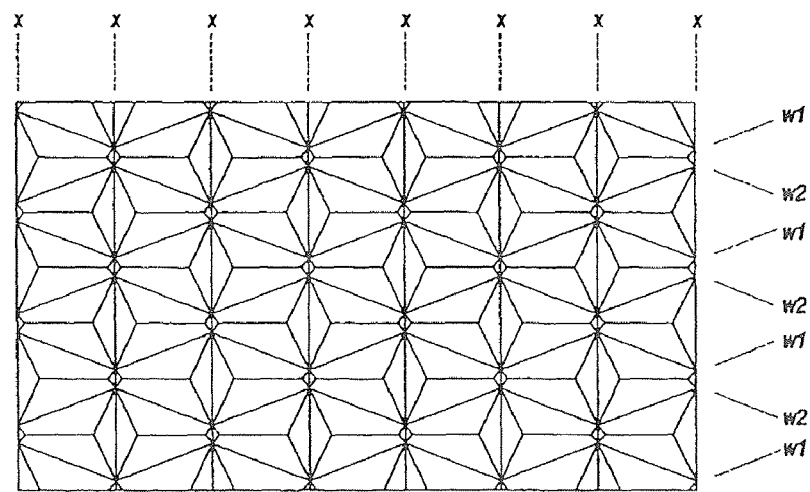
FIG. 6 shows a group of pairs of cube corner retroreflection elements in the invention.

FIG. 6 shows that a group of retroreflection elements formed of a large number of pairs of retroreflection elements shown in FIG. 5 is formed by a group of parallel V-shaped grooves (x) having substantially symmetric V-shaped cross sections and bottom portions with straight-line tracks and groups of parallel V-shaped grooves (w1 and w2) having substantially symmetric V-shaped cross sections and bottom portions with bent-line tracks.

Figure 12:
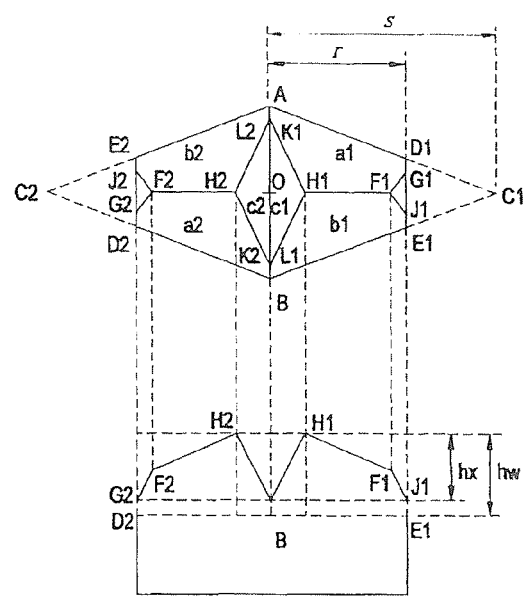
FIG. 12 shows a pair of cube corner retroreflection elements in the invention.
Figure 13:
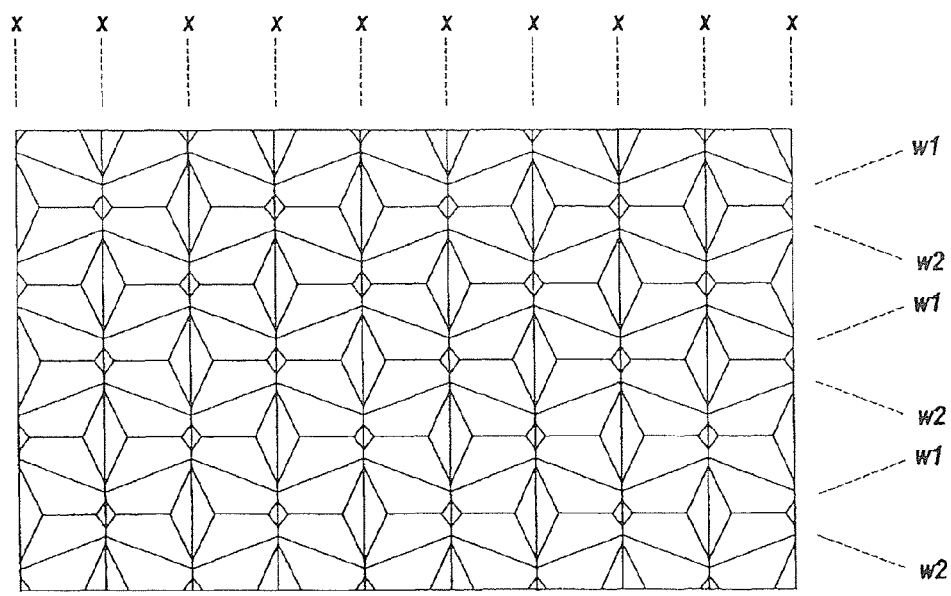
FIG. 13 shows a group of pairs of cube corner retroreflection elements in the invention.

FIG. 13 shows that a group of retroreflection elements formed of a large number of pairs of retroreflection elements shown in FIG. 12 is formed by a group of parallel V-shaped grooves (x) having substantially symmetric V-shaped cross sections and bottom portions with straight-line tracks and groups of parallel V-shaped grooves (w1 and w2) having substantially symmetric V-shaped cross sections and bottom portions with bent-line tracks.

In FIG. 13, a height (hx) is determined by a depth of the V-shaped groove in the direction x and a height (hw) is determined by a depth of the V-shaped grooves in the direction w1 and the direction w2. Therefore, the V-shaped groove in the direction x is formed to be shallower than the V-shaped grooves in the directions w1 and w2 and the V-shaped grooves in the direction w1 and the direction w2 are formed to have substantially the same depth.

Figure 7:
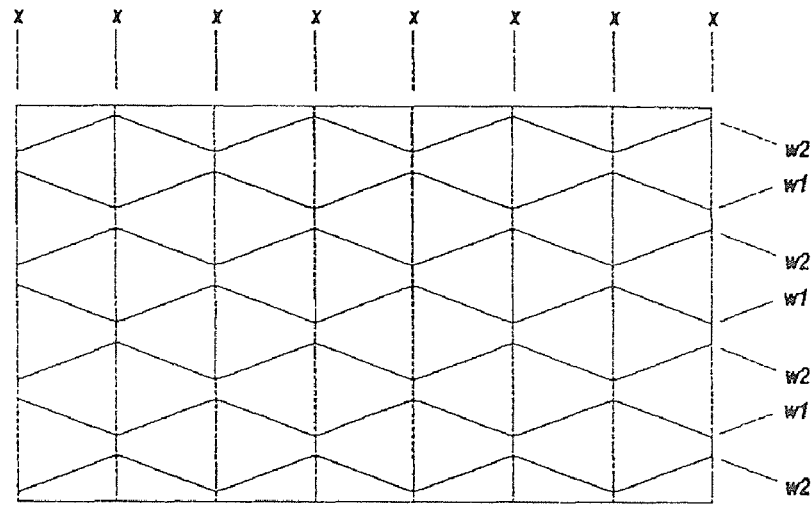
FIG. 7 shows V groove bottom tracks of a group of pairs of reflective elements in the invention.

FIG. 7 also describes, by showing only bottom tracks of the V-shaped grooves, that a group of pairs of retroreflection elements according to the invention is formed by a group of parallel V-shaped grooves (x) having substantially symmetric V-shaped cross sections and bottom portions with straight-line tracks and groups of parallel V-shaped grooves (w1 and w2) having substantially symmetric V-shaped cross sections and bottom portions with bent-line tracks.

In the group of parallel V-shaped grooves (x) in the direction x shown in a vertical direction in FIG. 7, the cross sectional shapes of the respective grooves have substantially the same angles and the grooves are arranged parallel at equal intervals. In the groups of V-shaped grooves (w1 and w2) in the direction w1 and the direction w2 having the bottom portions with bent-line tracks, the cross sectional shapes of the respective grooves also have substantially the same angles and the grooves are arranged parallel at equal intervals. Furthermore, the groups of V-shaped grooves in the direction w1 and the direction w2 are arranged parallel at equal intervals though their bends are out of phase with each other by half a cycle.

Figure 8:
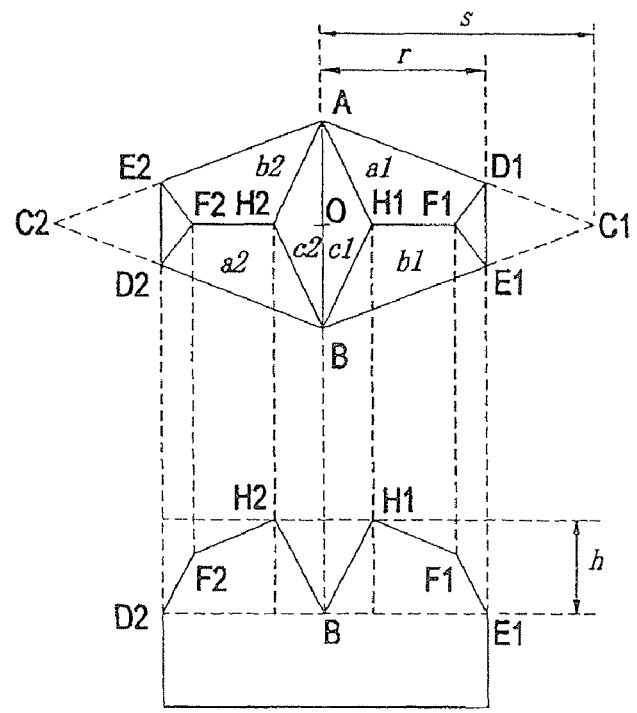
FIG. 8 shows a pair of cube corner retroreflection elements in the invention.

FIG. 8 also shows a retroreflection article where projection geometries of base planes forming the retroreflection elements are quadrilaterals (A-B-E1-D1 and A-B-E2-D2).

The retroreflection elements shown in FIG. 8 are formed by cutting off, with V-shaped grooves, one vertexes (C1, C2) of base planes of the conventionally known triangular pyramidal cube corner retroreflection elements having the same optic axis inclination angle (θ) and element height (h). The vertexes (C1, C2) of the base planes are positioned at the intersection points of extended lines of two base lines (A-D1, B-E1, and A-E2, B-D2) forming a quadrilateral base plane of the invention.

If a distance between two base lines (A-B and E1-D1 or A-B and E2-D2) forming the quadrilateral base plane of the retroreflection element shown in FIG. 8 is r and a distance between the intersection point (C1 or C2) of extended lines of the other oblique sides (A-D1, B-E1 or A-E2, B-D2) and the base line (A-B) is s, a ratio (R=r/s) between the distance r and the distance s is 0.6

Figure 9:
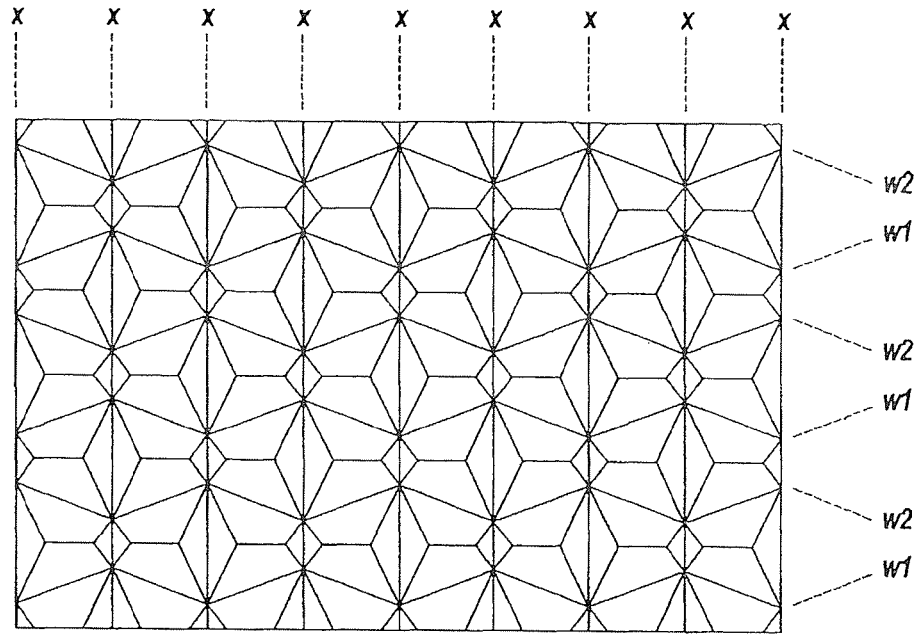
FIG. 9 shows a group of pairs of cube corner retroreflection elements in the invention.

FIG. 9 shows that a group of retroreflection elements formed of a large number of pairs of retroreflection elements shown in FIG. 8 is formed by a group of parallel V-shaped grooves (x) having substantially symmetric V-shaped cross sections and bottom portions with straight-line tracks and groups of parallel V-shaped grooves (w1 and w2) having substantially symmetric V-shaped cross sections and bottom portions with bent-line tracks.

Figure 10:
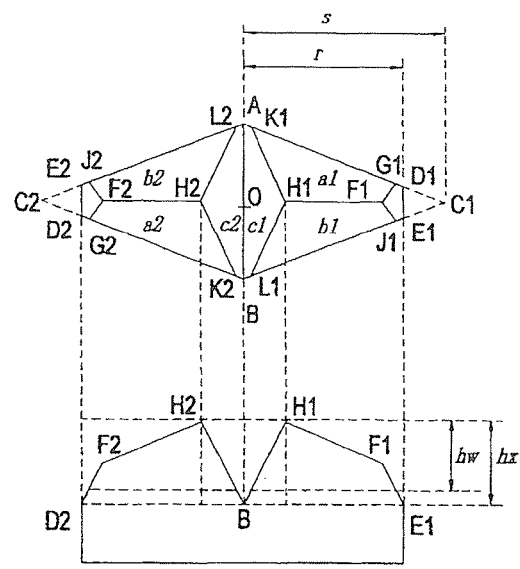
FIG. 10 shows a pair of cube corner retroreflection elements in the invention.

FIG. 10 shows a pair of retroreflection elements according to the invention formed by cutting off, with V-shaped grooves, one vertexes (C1, C2) of base planes of the conventionally known triangular pyramidal cube corner retroreflection elements having the same optic axis inclination angle (θ) and element height (h) as the triangular pyramidal retroreflection elements shown in FIG. 1. In these elements, a ratio (R) between the distance r and the distance s is 0.8 and a height (hx) from the base lines (A-B, D1-E1, and D2-E2) to the vertexes (H1, H2) of the elements is greater than a height (hw) from the sides (K1-G1, L1-J1, L2-J2, and K2-G2) to the vertexes (H1, H2) of the elements. Specifically, in FIG. 10, hx is 20% greater than hw.

Figure 11:
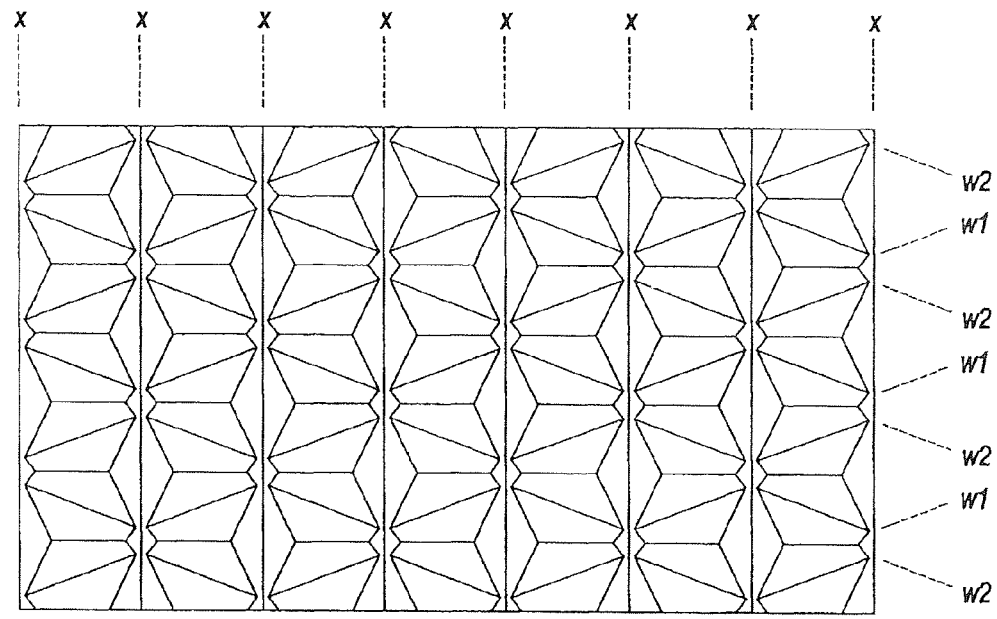
FIG. 11 shows a group of pairs of cube corner retroreflection elements in the invention.

In FIG. 11, the height (hx) is determined by a depth of V-shaped grooves in the direction x to be formed and the height (hw) is determined by a depth of V-shaped grooves in directions w1 and w2 to be formed. Therefore, the V-shaped groove in the direction x is formed to be deeper than the V-shaped grooves in the directions w1 and w2 and the V-shaped grooves in the direction w1 and the direction w2 are formed to have substantially the same depth.

FIG. 12 shows a pair of retroreflection elements according to the invention formed by cutting off, with V-shaped grooves, one vertexes (C1, C2) of base planes of the conventionally known triangular pyramidal cube corner retroreflection elements having the same optic axis inclination angle (θ) and element height (h) as the triangular pyramidal retroreflection elements shown in FIG. 1. In these elements, a ratio (R) between the distance r and the distance s is 0.6 and a height (hx) from the base lines (K1-L1, G1-J1, and G2-J2) to the vertexes (H1, H2) of the elements is smaller than a height (hw) from the sides (A-D1, B-E1, A-E2, and B-D2) to the vertexes (H1, H2) of the elements. Specifically, in FIG. 12, hx is 20% smaller than hw. Moreover, the common base line (K1-L1 or K2-L2) is at a higher position than a line segment A-B, the point K1 matches with the point L2, and the point L1 matches with the point K2.

FIGS. 14(a) and 14(b) describe one-side groove angles in the invention by taking the x groove as an example. In FIG. 14(a) describing a conventional art, a one-side groove angle (GLx) between one of the retroreflection side faces and the normal to the element base plane at the bottom portion of the V-shaped groove is equal to the other one-side groove angle (GRx) in FIG. 14(b) describing the invention, on the other hand, there is a deviation of dGx from a regular one-side groove angle.

In the invention, dGx is preferably 0.0001 to 0.1°. When dGx is smaller than 0.0001°, divergence of light is too little and it is difficult to improve the observation angularity. When dGx is over 0.1°, divergence of light is too much and the retrorefrectivity in the front direction is seriously impaired.

Figure 14:
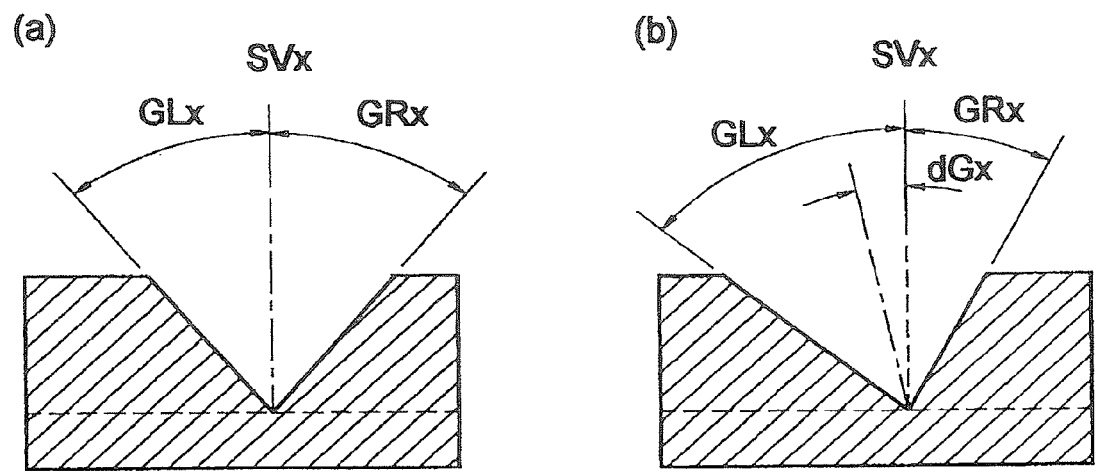
FIGS. 14(a) and 14(b) show one-side groove angles in the invention.
Figure 15:
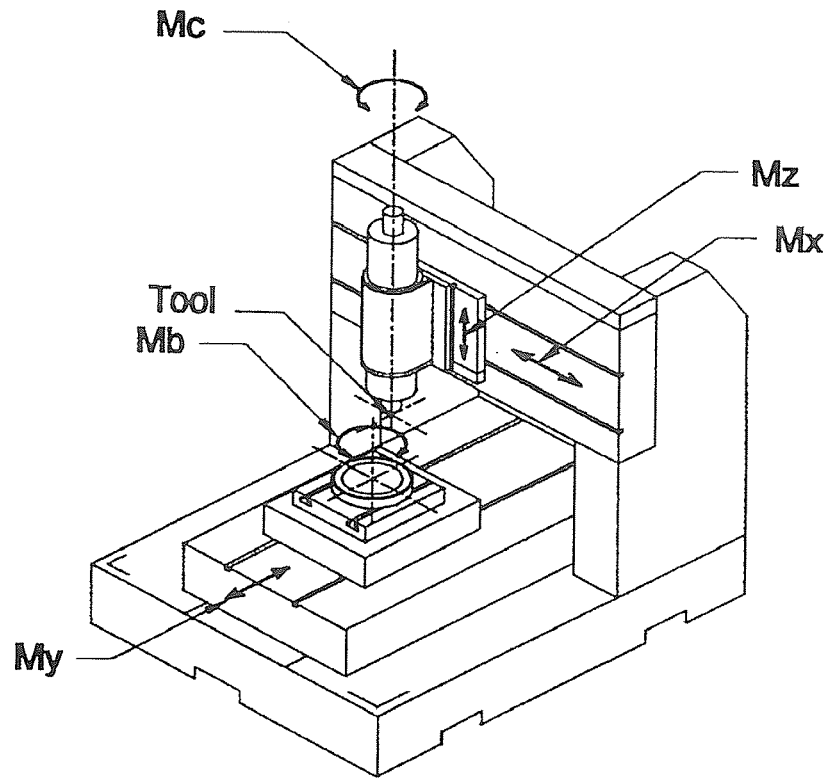
FIG. 15 shows a processing machine used to form the retroreflection elements in the invention.

FIG. 14 shows an example of a shaper machine used to form a group of pairs of retroreflection elements according to the invention. This machine includes a rotary table (Mb axis) disposed on slide tables in two directions shown as an Mx axis and an My axis in FIG. 14 and a diamond tool disposed at a lower end of another rotation axis (Mc axis) disposed on a slide shaft (Mz axis) mounted above the rotary table. A workpiece material is fixed on to the rotary table, the diamond tool is pressed against the material with certain force, and the tool is moved along the Mx axis or the My axis. In this way, a V-shaped groove with any track is formed. At this time, by controlling a position of the Mx axis, it is possible to slightly change the depth of the V-shaped groove. Moreover, by slightly rotating the Mc axis to form the V-shaped groove in the invention, a projection geometry of the tool having a V-shaped tip end can be changed and, as a result, an angle of the V-shaped groove can be changed continuously in one V-shaped groove.

In shaping processing, it is necessary to repeat the grooving several times to obtain a predetermined depth to form a V-shaped groove of a desired depth, when a single grooving provides a depth of 1 to 10 μm, for example. By movements along the Mx axis and the My axis during the processing, it is possible to form a V-shaped groove with not only a straight-line track but also any track. In this way, it is possible to form retroreflection elements according to the invention where the base line forming the V-shaped groove in any direction in a pair of retroreflection elements is a nonlinear base line with a track that is not a straight line.

As the tool for forming the retroreflection elements in the invention, diamond, sapphire, and various cutting alloys can be used. Among them, diamond is excellent especially in wear resistance and suitable for maintaining the constant angle of the V-shaped groove during the processing. To avoid change in the angle of the V-shaped groove due to wear, two processing tools may be used to separately carry out preliminary cutting to a predetermined depth and finish cutting to a target depth.

It is also possible to carry out the V-shaped grooving method by a conventionally known processing method, so-called fly cutting. By changing a mounting angle of the diamond tool, it is possible to change the projection geometry of the tool to thereby finely change the angle of the V-shaped groove. The fly cutting has an advantage that a single cutting can form a groove of a desired depth. However, the fly cutting is not suitable for forming an arbitrary nonlinear track with accuracy, though it is suitable for forming the straight-line track. Moreover, the tool mounting angle cannot be changed during the processing to change the angle of the V-shaped groove in one V-shaped groove.

Figure 16:
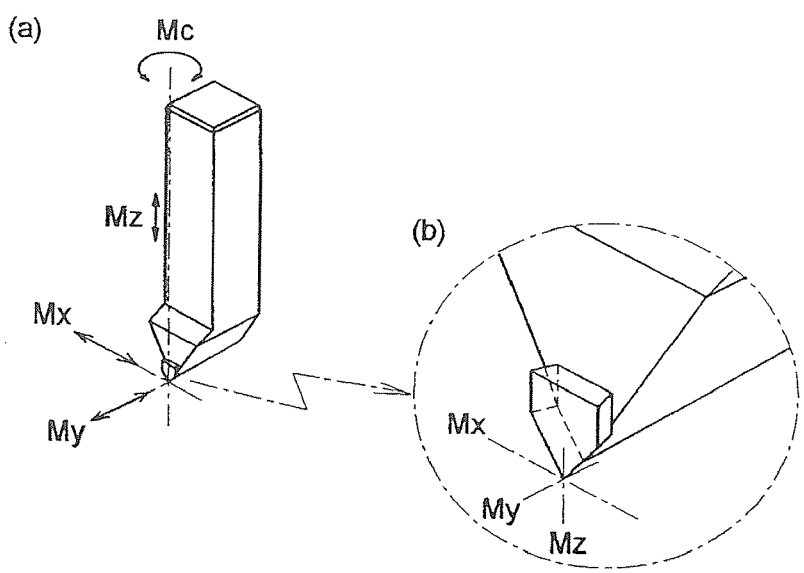
FIGS. 16(a) and 16(b) show a processing tool used to form the retroreflection elements in the invention.
Figure 17:
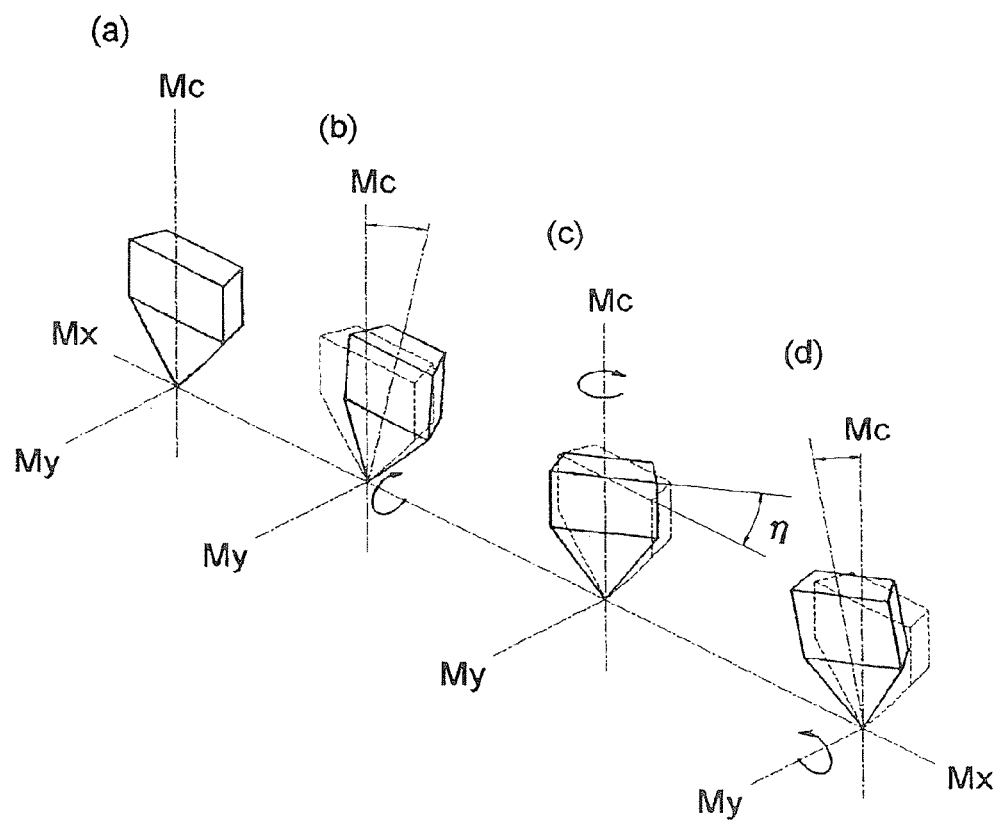
FIGS. 17(a) to 17(d) show a method of mounting the processing tool used to form the retroreflection elements in the invention.

FIG. 16(a) shows an example of the diamond tool used to form the retroreflection elements in the invention. The diamond having the V-shaped tip end shown in an enlarged view in FIG. 16(b) is mounted to the tip end of the tool and the shape and the angle of the V-shaped groove reflect the projection geometry of the diamond. Furthermore, FIGS. 17(a)

to 17(d) show how the V-shaped grooves to be formed can be changed by changing the projection geometry of the V-shaped tip end due to changing mounting angle of the diamond tool in various ways.

FIG. 17(a) shows a standard way of mounting, in which the symmetric V-shaped diamond is mounted perpendicularly to a processing reference surface in a symmetric position. The processing tool can be rotated in three directions along the above-described processing axes in three directions.

FIG. 17(b) shows that it is possible to reduce the angle of the V-shaped groove by slightly inclining the processing tool by rotating along the Mx axis and about the tip end of the tool. Such change can be normally achieved by changing the mounting angle of the tool in the vertical direction (Mc axis).

FIG. 17(c) shows that it is possible to slightly reduce the angle of the V-shaped groove by changing the projection geometry by slightly turning the tool by rotation (angle; q) along the Mc axis and about the tip end of the processing tool. Such change in the angle can be achieved by turning the Mc axis during the processing of the V-shaped groove and the cross sectional shape of the V-shaped groove formed by such a method does not have a constant angle.

A relationship between the turning angle (η) and a projection angle (that is equal to the sum of both the one-side groove angles and is also referred to as a "both-side groove angle (2G')") of the tip end of the cutting tool shown in FIG. 17(c) can be expressed by the expression 1.

$$2G' = 2\tan^{-1}(\tan G \cdot \cos \eta) \quad \text{Expression 1}$$

In the expression 1, G represents the one-side groove angle of the tip end of the processing tool that is not turned, η represents the turning angle of the tool shown in FIG. 17(c), and G' represents the projection one-side groove angle of the turned tool.

Specifically, the one-side groove angle of the tip end of the processing tool required to form the regular triangular pyramidal cube corner retroreflection element without inclination of the optic axis is 35.2640°. The projection angle G' when the tool is turned η=1° is 35.2599°, the projection angle G' when the tool is turned η=2° is 35.2475°, and the projection angle when the tool is turned η=10° is 34.8516°. Such slight change in angle is way over manufacturing accuracy of the processing tool. However, excessive turning angle is undesirable because of limitation due to the thickness of the processing tool and a rake angle of the processing tip end portion as shown in FIGS. 16(a) and 16(b).

Furthermore, by a method shown in FIG. 17(d), it is possible to change the V-shaped groove into an asymmetric shape by slightly inclining leftward or rightward about the tip end of the processing tool and in a direction along the My axis. Both the left and right sides of such an asymmetric V-shaped groove can be formed simultaneously by using the symmetric V-shaped tool or can be formed separately by using an asymmetric tool. This method is especially effective in forming an asymmetric V-shaped groove.

The method of forming the retroreflection article in the invention will be described below in further detail with reference to the drawings.

Figure 18:
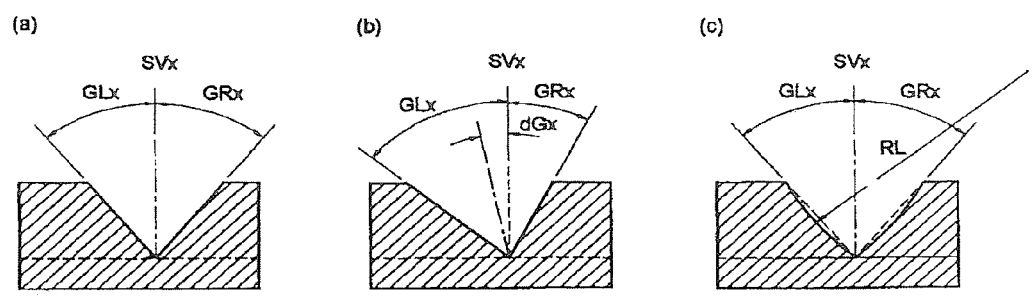
FIGS. 18(a) to 18(c) are cross sectional views of conventional V-shaped grooves.
Figure 19:
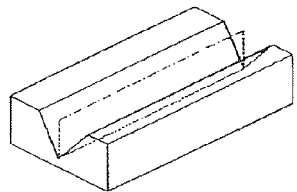
FIGS. 19(a) to 19(c) are cross sectional views of conventional V-shaped grooves.
Figure 19:
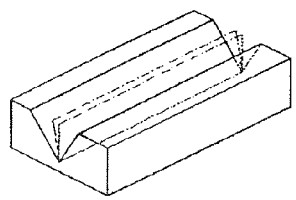
Figure 19:
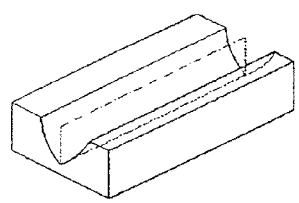

FIGS. 19(a) to 19(c) show methods of forming the V-shaped grooves in order to form a group of a large number of pairs of triangular pyramidal cube corner retroreflection elements by conventionally known methods. In FIG. 19(a), a bilaterally symmetric V-shaped groove is formed. One-side groove angles (GLx, GRx in FIG. 18(a)) of a cross section of the formed V-shaped groove are constant in one V-shaped groove.

In FIG. 19(b), a left-right asymmetric V-shaped groove is formed. One-side groove angles (GL, GR in FIG. 18(b)) of a cross section of the formed V-shaped groove are also constant in one V-shaped groove.

In FIG. 19(c), a groove having a curved cross section is formed. One-side groove angles (GL, GR in FIG. 18(c)) of a cross section of the formed groove having the curved cross section are in a constant shape in one V-shaped groove.

Figure 20:
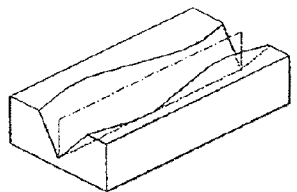
FIGS. 20(a) to 20(c) are cross sectional views of V-shaped grooves in the invention.
Figure 20:
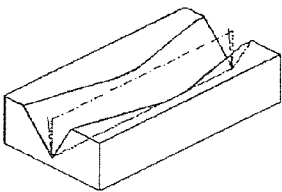
Figure 20:
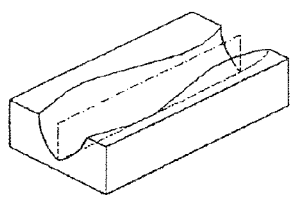
Figure 21:
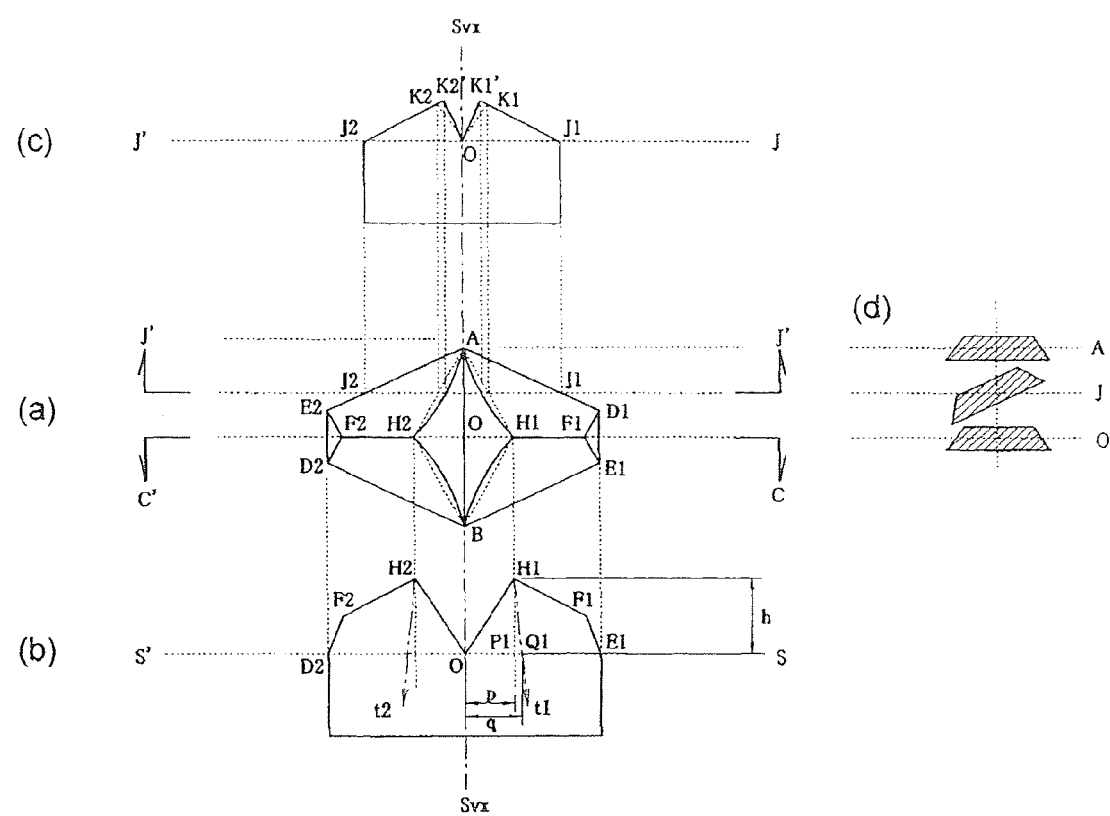
FIGS. 21(a) to 21(d) show a pair of retroreflection elements in the invention.

FIGS. 20(a) to 20(c) show methods of forming V-shaped grooves used to form a retroreflection article formed of a group of a large number of pairs of triangular pyramidal cube corner retroreflection elements in the invention, in which a line segment formed by the intersection of a plane perpendicular to both of a common plane (S-S') and a V groove vertical plane (Svx, Svw1, or Svw2) perpendicular to the common plane (S-S') and including a base line of the V-shaped groove, and a reflective side face (a1, b1, c1, a2, b2, or c2) including the base line of the V-shaped groove.

FIG. 20(a) shows a V-shaped groove where one-side groove angles (GL, GR) continuously change in a bilaterally symmetric state (GL=GR), the one-side groove angle (GLx, GRx, GLw1, GRw1, GLw2, or GRw2) is not constant in the above-mentioned reflective side face, and the reflective side faces form curved faces and/or a plurality of planes. A specific processing method for this groove is one shown in FIG. 17(b) or FIG. 17(c) in which the groove can be obtained by inclining or turning the processing tool while processing the V-shaped groove to thereby continuously change the tool projection geometry.

FIG. 20(b) shows a V-shaped groove where one-side groove angles (GL, GR) continuously change in a left-right asymmetric state, the one-side groove angle (GLx, GRx, GLw1, GRw1, GLw2, or GRw2) is not constant in the reflective side face, and the reflective side faces form curved faces and/or a plurality of planes. A specific processing method for such groove is one shown in FIG. 17(d) in which the groove can be obtained by inclining the processing tool leftward and rightward while processing the V-shaped groove to thereby asymmetrically and continuously change the tool projection geometry.

FIG. 20(c) shows a V-shaped groove having a curved cross section where one-side groove angles (GL, GR) continuously change in a bilaterally symmetric state (GL=GR), the one-side groove angle (GLx, GRx, GLy, GRy, GLz, or GRz) is not constant in the reflective side face, and the reflective side faces form curved faces and/or a plurality of planes. A specific processing method for such groove is one shown in FIG. 17(b) or FIG. 17(c) using the processing tool having a curved cross section, in which the groove can be obtained by inclining or turning the processing tool while processing the V-shaped groove to thereby continuously change the tool projection geometry. It is also possible to form a left-right asymmetric groove as shown in FIG. 20(b) by using this processing tool having the curved cross section.

An example of a pair of triangular pyramidal cube corner retroreflection elements according to the invention will be described by using FIGS. 21(a) to 21(d). The pair of elements is produced by forming, by the above method, the V-shaped groove where one-side groove angles (GL, GR) continuously change, the one-side groove angle (GLx, GRx, GLw1, GRw1, GLw2, or GRw2) is not constant in the reflective side face, and the reflective side faces form curved faces and/or a plurality of planes.

FIG. 21(a) is a plan view of the pair of retroreflection elements according to the invention. The two elements share a base line (A-B) in a direction x with their reflective side faces (A-B-H1, A-B-H2) facing each other. Base planes (A-B-E1-D1, A-B-D2-E2) of the two elements are on a common plane (S-S').

FIG. 21(b) shows a cross sectional shape of the pair of retroreflection elements shown in FIG. 21(a) taken along a cross section line C-C'. A cross section of the V-shaped groove in the direction x is shown as H1-O-H2, the cross section has a symmetric straight-line shape, and the one-side groove angle is formed of such a regular angle at which three reflective side faces are perpendicular to each other.

FIG. 21(c) shows a cross sectional shape (O-K1'-J1, O-K2'-J2) taken along a cross section line J-J' of the pair of retroreflection elements shown in FIG. 21(a). A cross section of the V-shaped groove in the direction x is shown as K1'-O-K2' and the cross section has a bilaterally symmetric straight-line shape. However, the shape (K1'-O-K2') of the V-shaped groove is different from and smaller than the regular angle K1-O-K2 shown in FIG. 21(b).

FIG. 21(d) shows a method of turning the cutting tool to change its projection geometry in order to form the V-shaped groove shown in FIG. 21(c) having the angle smaller than the regular angle. At positions O and A, the cutting tool is not turned and its projection geometry has such a regular angle that the three reflective side faces are perpendicular to each other. At a position J, the cutting tool is turned around the Mc axis of the machine and its projection geometry is slightly smaller than the regular angle at which the three reflective side faces are perpendicular to each other. As the cutting tool moves from the point A to the point O in the plan view in FIG. 21(a), it is turned continuously around the Mc axis of the machine and its projection geometry continuously changes with respect to the regular angle at which the three reflective side faces are perpendicular to each other as shown in FIG. 21(d).

Therefore, the reflective side faces (A-B-H1, A-B-H2) facing each other form curved faces instead of planes while the cross section has a shape of a straight-line V-shaped groove at any position. The reflective side faces having such curved faces do not retroreflect an incident light beam parallel toward a light source. Consequently, the reflective side faces having such curved faces reflect light beam at various reflection angles and therefore it is possible to obtain preferable observation characteristic with a divergence pattern in which the retroreflected light beam spreads uniformly.

Although the cross sectional view in FIG. 21(b) shows optic axes (t1, t2), the optic axes shown here means optic axes of cube corner retroreflection elements formed of reflective side faces having plane shapes corresponding to the reflective side faces that do not have plane shapes since parts of the reflective side faces do not have plane shapes in the invention. However, deviations of the reflective side faces that do not have the plane shapes from the planes are extremely minute in the retroreflection elements in the invention and the entrance angularity determined by the optic axes can be calculated approximately based on the corresponding optic axes.

Alternatively, by a similar method, V-shaped grooves in directions x, w1, and w2 may be formed in a repeated pattern of a combination of several kinds of V-shaped grooves having deviations from several different planes. Such a combination is particularly preferable because it allows a uniform spread of retroreflected light.

To obtain uniform retrorefrectivity at various observation angles, it is particularly preferable that the group of pairs of retroreflection elements forming the retroreflection article according to the invention is a group of a large number of pairs of triangular pyramidal cube corner retroreflection elements in which the one-side groove angle (GLx, GRx, GLw1, GRw1, GLw2, GRw2) is not constant with a maximum deviation of 0.0001 to 0.1° from a regular one-side groove angle forming a cube corner in a reflective side face having a V-shaped groove (x, w1, or w2) in at least one direction as its base line, the groove forming the pair of retroreflection elements and the reflective side face forms a curved face and/or a plurality of planes.

In similar conventional techniques, because only one deviation of a one-side groove angle or a vertex angle can be given to one retroreflection element, an extremely complicated processing method must be employed to form a combination of several one-side groove angles.

However, by the method of providing deviations of the one-side groove angle in the invention, it is possible to continuously change the angle from the angle with the maximum deviation to the angle without any deviation from the regular one-side groove angle in one element. Therefore, the formed retroreflection element may have all vertex angles from the angle with a deviation based on the maximum deviation to a regular vertex angle.

There is also an advantage that the maximum possible deviation can be obtained easily by using a single cutting tool and adjusting its turning angle. Specifically, by adjusting a change pattern of the turning angle of the processing tool for one element or several adjacent elements, it is possible to preferentially improve the retroreflective performance of portions with small observation angles by employing small turning angles in a larger area and it is possible to preferentially improve the retroreflective performance of portions with larger observation angles by employing large turning angles in a larger area.

The maximum possible deviation from the regular one-side groove angle is preferably 0.0001 to 0.1°. When the maximum deviation is smaller than 0.0001°, divergence of light is too little and it is difficult to improve the observation angularity. When the maximum deviation is over 0.1°, divergence of light is too much and the retrorefrectivity in the front direction is seriously impaired.

To provide uniform retroreflection pattern to incident lights from various directions of the element, it is preferable that the group of pairs of retroreflection elements forming the retroreflection article according to the invention is a group of a large number of pairs of triangular pyramidal cube corner retroreflection elements in which an angle (one-side groove angle; GLx, GRx, GLw1, GRw1, GLw2, or GRw2) is not constant in V-shaped grooves in three directions forming the pairs of triangular pyramidal cube corner retroreflection elements and the reflective side face forms a curved face and/or a plurality of planes, the angle (one-side groove angle) being an angle between a vertical plane (V groove vertical plane; Svx, Svw1, or Svw2) perpendicular to a common plane (S-S') and including a base line of the V-shaped groove and a line segment formed by the intersection of a plane perpendicular to both the V groove vertical plane and the common plane (S-S') and the reflective side face including the base line.

However, it is also possible to selectively improve the observation angularity in a particular direction. This is achieved by selectively giving deviations to the one-side groove angles of the V-shaped groove in the particular direction.

Figure 22:
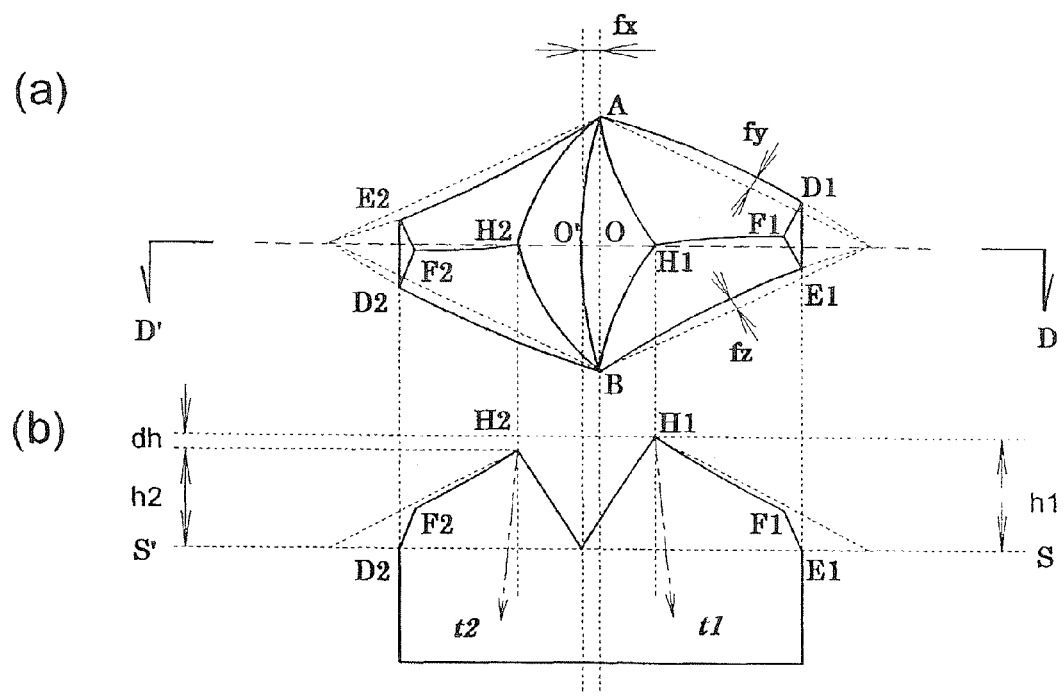
FIGS. 22(a) and 22(b) show a pair of retroreflection elements in the invention.

FIGS. 22(a) and 22(b) are a plan view and a cross sectional view of another pair of triangular pyramidal cube corner retroreflection elements according to the invention. In this aspect, because all base lines are nonlinear, three reflective side faces do not form planes. In FIG. 22(a), two elements share the nonlinear base line (A-O'-B) in the direction x and the two reflective side faces (A-O'-B-H1, A-O'-B-H2) face each other. Base planes (A-O'-B-E1-D1, A-O'-B-D2-E2) of the two elements are on a common plane (S-S'). The base line (A-O'-B) is curved and nonlinear. A nonlinear factor (fx) is defined by a maximum distance between a point (O') where a perpendicular line (O-O') from an opposite-end straight line (A-B) connecting both ends of the nonlinear base line (A-O'-B) to the nonlinear base line and the nonlinear base line intersect with each other and the opposite-end straight line (A-B). Herein, the nonlinear factor (fx) is 0.0001L to 0.05L, where L is the length of the opposite-end straight line. The other two base lines are also formed so that nonlinear factors (fy and fz) defined by the maximum distances from the opposite-end straight lines are 0.0001L to 0.05L, where L is the lengths of the opposite-end straight lines. The factors fx, fy, and fz may be the same as or different from each other.

FIG. 22(b) shows a cross sectional shape of the pair of retroreflection elements shown in FIG. 22(a) taken along a cross section line D-D'. A cross section of a V-shaped groove in the direction x is shown as H1-O'-H2, the cross sectional shape is formed of bilaterally symmetric straight lines, and one-side groove angle is an angle equal to the regular angle at which the three reflective side faces are perpendicular to each other. A cross sectional shape of each of V-shaped grooves in the directions y and z is also formed of bilaterally symmetric straight lines and one-side groove angle is an angle equal to the regular angle at which the three reflective side faces are perpendicular to each other.

In FIG. 22(b), because the bilaterally symmetric V-shaped groove for the nonlinear base line (A-O'-B) is formed at a position displaced by fx from the opposite-end straight line (A-B), the left and right elements have different heights (h1, h2). However, the left and right elements may have the same height depending on values of the employed nonlinear factors (fx, fy, and fz).

Figure 23:
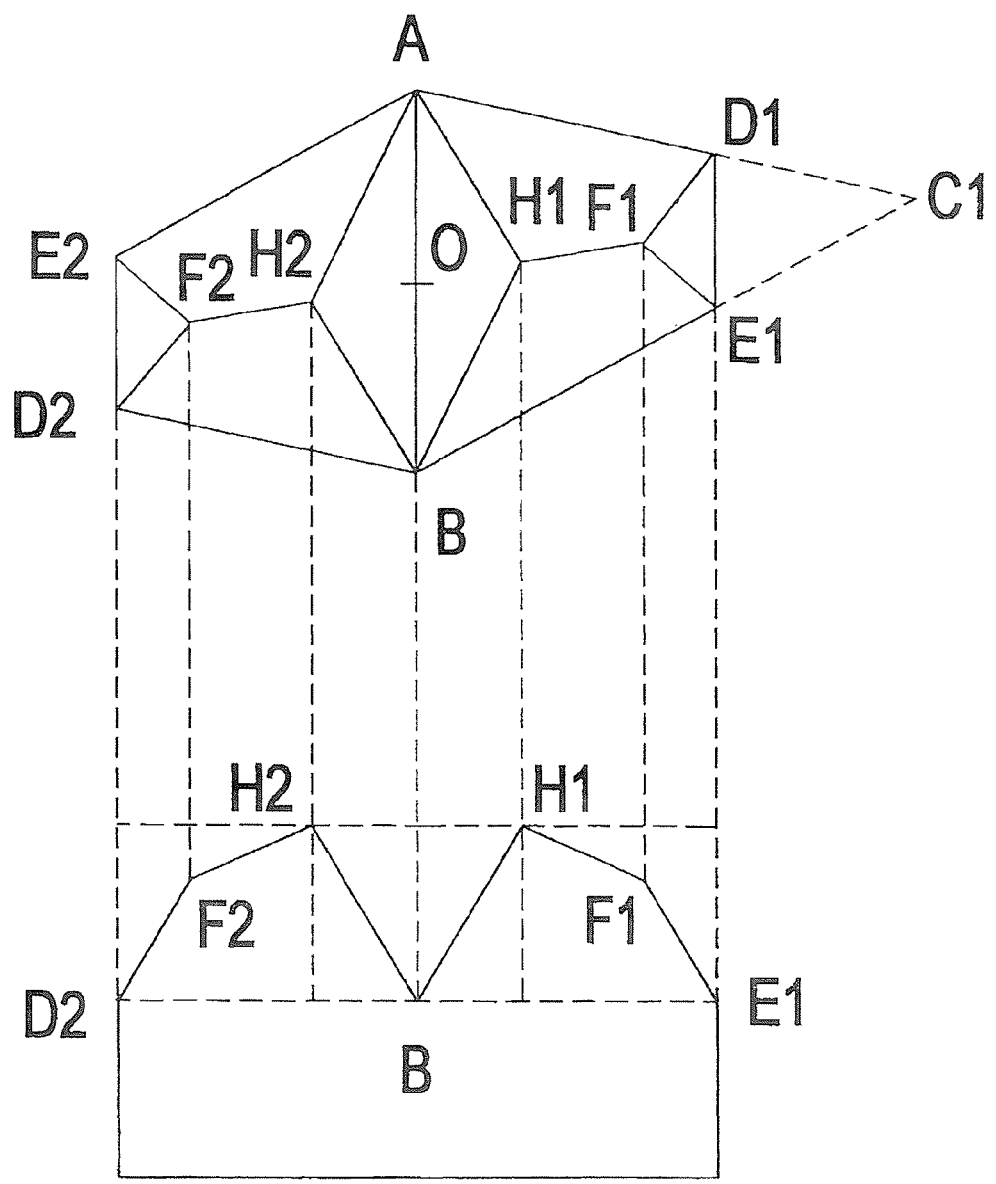
FIG. 23 shows a pair of retroreflection elements in the invention.

FIG. 23 shows retroreflection elements of the invention. If an angle between C1-A and A-B is rA1, an angle between A-B and B-C1 is rB1, and an angle between B-C1 and C1-A is rC1, rA1, rB1, and rC1 are substantially different from each other, and thus common ridge lines (H1, C1 and H2, C2) of the two inclined faces (a1, b1 and a2, b2) do not extend in a direction perpendicular to a common vertical plane and therefore do not extend in directions of inclination of optic axes of the retroreflection elements. For example, if the optic axes are inclined toward the faces a, better retroreflective performance is exerted when light enters from the directions of the faces a than when light enters from the directions of the faces b.

The optic axes of the retroreflection elements in the invention are inclined with respect to the vertical plane shared by the common ridge lines (H1, C1 and H2, C2) of the two inclined faces (a1, b1 and a2, b2) and also inclined toward the face a (or the face b) and therefore the improved retroreflective performance is exerted in both of the directions. As a result, the retroreflective performance of the invention is exerted. Therefore, if the retroreflection elements in the invention are used for roadside signs, the retroreflective performance in a left-right direction with respect to a traveling direction on a road is improved and the vertically biased retroreflective performance can also be achieved. Similar improvements can be achieved for overhead signs and various information signs as well as for the roadside signs.

Figure 24:
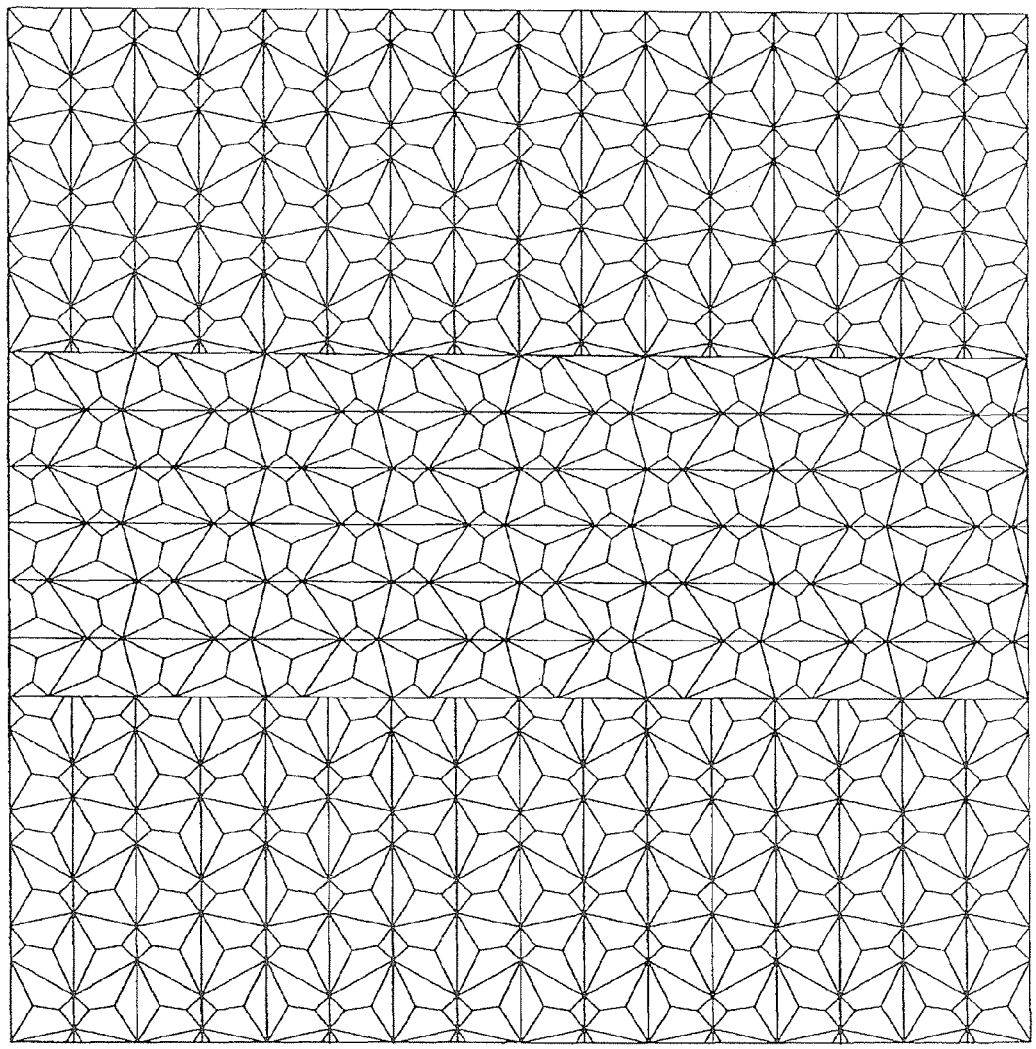
FIG. 24 is a plan view of a retroreflection article according to the invention.

FIG. 24 is a plan view of an example of a retroreflection device including first zones and second zones, in which an angle between a line x1 in the first zone and a line x2 in the second zone is 5 to 175° and preferably 80 to 100°. The two zones are disposed in combination in a repeated pattern so that an angle ($\eta 1$) which the first zone makes with an outer edge is 0° and that an angle ($\eta 2$) which the second zone makes with an outer edge is 90°.

Figure 25:
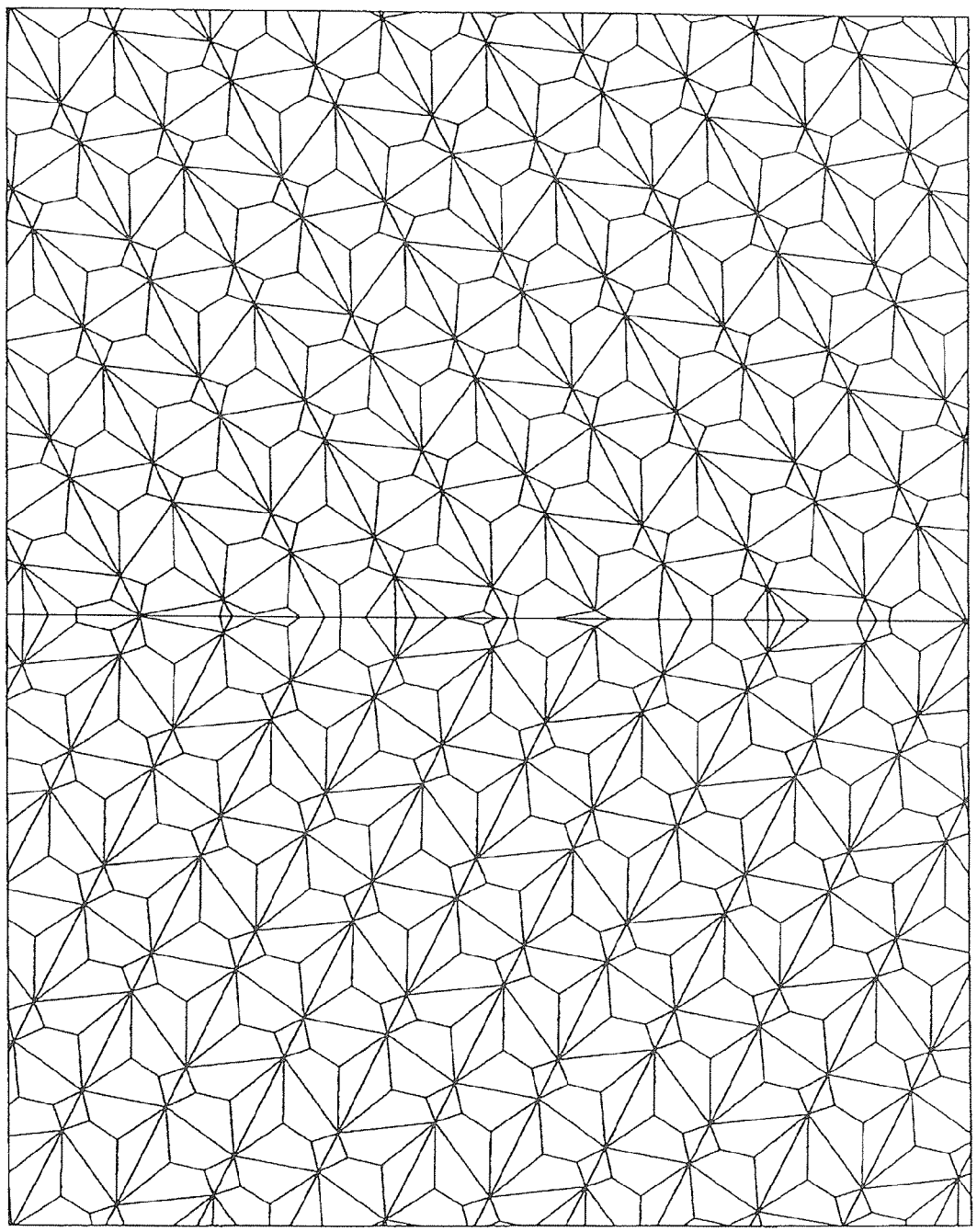
FIG. 25 is a plan view of a retroreflection article according to the invention.
Figure 26:
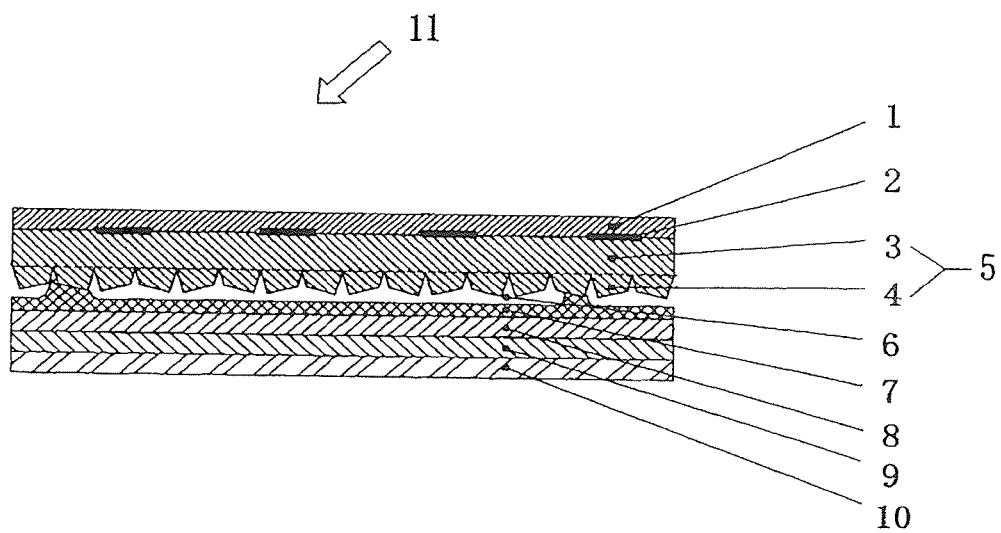
FIG. 26 is a cross sectional view of a cube corner retroreflection article in the invention.
Figure 27:
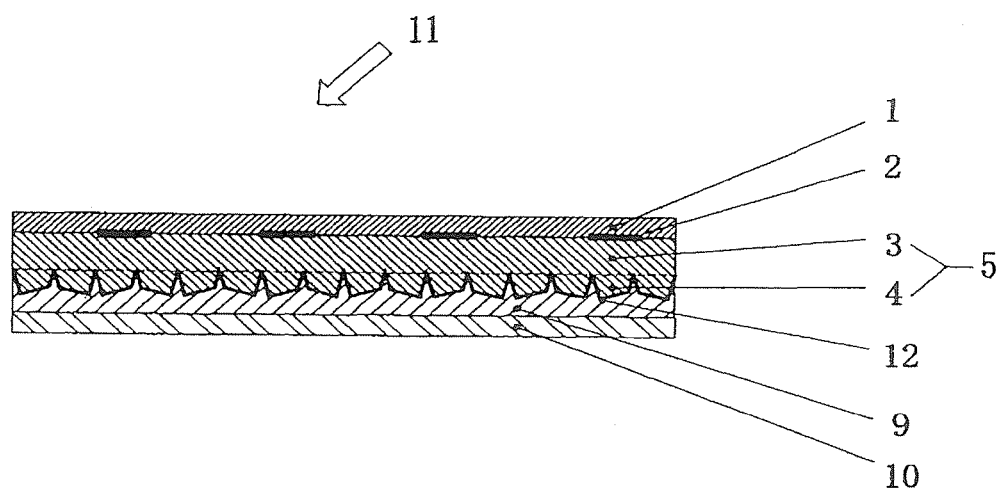
FIG. 27 is a cross sectional view of a cube corner retroreflection article in the invention.

FIG. 25 is a plan view of an example of a retroreflection device including first zones and second zones. The two zones are disposed in combination in a repeated pattern so that an angle ($\eta 1$) which the first zone makes with an outer edge is 135° and that an angle ($\eta 2$) which the second zone makes with an outer edge is 45°.

As described above, in the retroreflection device including the first zone and the second zone, in which the angle between the line x1 of the first zone and the line x2 of the second zone is 5° to 175° and preferably 80° to 100°, it is possible to make the entrance angularities in the horizontal direction, the vertical direction, and the direction between them uniform by combining the respective zones.

The retroreflection device may include three or more zones. By combining the respective zones while dividing the angles so that the angles which the lines x of the respective zones make become uniform in all directions, it is possible to make the entrance angularities in the horizontal direction, the vertical direction, and the direction between them more uniform.

According to conventionally known V groove forming method or plate method, a die of close-packed element pairs can be obtained and the retroreflection article according to the invention can be formed by a method such as compression molding, injection molding, injection compression molding, and cast molding by using the molding die having recessed shapes obtained by inverting the retroreflection elements shown in FIGS. 5 to 25.

The recessed molding die can be prepared by preparing a protruding die by a conventionally known method such as fly cutting, finish cutting, shaping, ruling, milling, and pressing and then inverting the protruding die by electroforming.

The retroreflection article according to the invention can be formed by using conventionally known resin Examples of preferable resin are acrylic resin, polycarbonate resin, styrene resin, vinyl chloride resin, and polyester resin but the resin is not limited thereto as long as it is excellent in transparency and durability.

Moreover, it is possible to add various additives to the resin. For example, it is possible to add colorants such as dyes and pigments, ultraviolet absorbing agents for giving weather resistance, antioxidants, light stabilizers, and the like to the resin forming the retroreflection elements. Moreover, it is also preferable to provide another layer of resin on a resin layer forming the retroreflection elements in order to improve weather resistance.

To use the retroreflection article according to the invention for traffic signs, construction signs, commercial signs, vehicle license plates, vehicle reflective tapes, roadside reflectors, reflectors of optical sensors, safety apparels, and the like as specific applications, various information display means such as a printed layer and other information display bodies may be laminated on the article.

In particular, the retroreflection article of the invention is preferably thin and in a form of a soft sheet. To obtain such a sheet-like product, a size (h) of a retroreflection element is preferably from 30 to 500 µm, for example.

Next, an aspect of a preferred structure of a cube corner retroreflection sheet and the retroreflection article of the invention will be described with reference to a cross sectional view of the aspect in FIG. 10.

In FIG. 10, a reference numeral 4 denotes a retroreflection element layer in which the retroreflection elements of the invention are disposed in a close-packed state, 3 denotes a holding-body layer for retaining the reflective elements, and 11 denotes an incident direction of light. The reflective element layer (4) and the holding-body layer (3) are generally united into one body (5) but may be laminated separate layers. Depending on the application and environment of use of the retroreflection sheet and the retroreflection article according to the invention, it is possible to provide a surface protecting layer (1), a printed layer (2) for conveying information to an observer or for coloring the sheet, a binder layer (7) for achieving a sealed structure so as to prevent entry of moisture into a back face of the retroreflection element layer, a support layer (8) for supporting the binder layer (7), and an adhesive layer (9) and a release liner layer (10) for sticking the retroreflection sheet and the retroreflection article to another structure.

The printed layer (2) can be normally disposed between the surface protecting layer (1) and the holding-body layer (3), on the surface protecting layer (1) or on the reflective faces of the reflective elements (4) by means of gravure printing, screen printing, ink jet printing, or the like.

Although materials forming the reflective element layer (4) and the holding-body layer (3) are not particularly limited as long as they have sufficient flexibility that is one of objects of the invention, they preferably have optical transparency and uniformity. Examples of material that can be used in the invention include polycarbonate resin, vinyl chloride resin, (meth)acrylic resin, epoxy resin, styrene resin, polyester resin, fluorine resin, olefin resin such as polyethylene resin and polypropylene resin, cellulosic resin, and urethane resin. Moreover, it is possible to use each of an ultraviolet absorbing agent, a light stabilizer, an antioxidant, and the like alone or in combination for the purpose of improving weather resistance. Furthermore, the layers may contain various organic pigments, inorganic pigments, fluorescent pigments, dyes, fluorescent dyes, and the like as colorants.

The same resins as those taken as examples of resin that can be used for the retroreflection element layer (4) can be used for the surface protecting layer (1) and it is possible to use each of an ultraviolet absorbing agent, a light stabilizer, an antioxidant, and the like alone or in combination for the purpose of improving weather resistance. Furthermore, the layer may contain various organic pigments, inorganic pigments, fluorescent pigments, dyes, fluorescent dyes, and the like as colorants.

In general, an air layer (6) is disposed on a back side of the retroreflection elements for the purpose of increasing a critical angle satisfying an internal total reflection condition of the reflective element layer (4) in the invention. The reflective element layer (4) and the support layer (8) are preferably sealed with the binder layer (7) in order to prevent troubles such as reduction in the critical angle and corrosion of the metal layer due to entry of moisture under conditions of use.

As a method of sealing, methods disclosed in the U.S. Pat. Nos. 3,190,178 and 4,025,159, Japanese Utility Model Application Laid-open No. 50-28669, and the like can be employed. Examples of resin used for the binder layer (7) include (meth) acrylic resin, polyester resin, alkyd resin, and epoxy resin. As a method of joining, known methods such as a thermal adhesive resin joining method, a thermosetting resin joining method, an ultraviolet curable resin joining method, and an electron beam curable resin joining method can be suitably employed.

The binder layer (7) used in the invention can be applied over the entire surface of the support layer (8) or can be selectively disposed at junctions with the retroreflection element layer by printing or the like.

As examples of material forming the support layer (8), it is possible to use any of the resin forming the retroreflection element layer, general resin that can be formed into a film, fibers, fabric, metal foil or a metal sheet made of stainless steel, aluminum, and the like alone or in combination.

As the adhesive layer (9) used for sticking the retroreflection sheet and the retroreflection article of the invention to a metal plate, a wooden plate, a glass plate, a plastic plate, or the like and the release liner layer (10) for the adhesive, it is possible to suitably choose known ones. As the adhesive, it is possible to suitably choose pressure-sensitive adhesive, heat-sensitive adhesive, cross-linked adhesive, or the like. As the pressure-sensitive adhesive, it is possible to use polyacrylic acid ester adhesive such as butylacrylate, 2-ethylhexylacrylate, isooctyl acrylate, nonyl acrylate, or the like obtained by copolymerizing acrylic acid ester with acrylic acid, vinyl acetate, or the like, silicon resin adhesive, rubber adhesive, or the like. As the heat-sensitive adhesive, acrylic, polyester, or epoxy resin or the like can be used.

Next, another aspect of the preferred structure of the retroreflection article based on the invention will be described with reference to FIG. 11 showing a cross sectional view of the aspect.

In FIG. 11, a metal mirror reflection layer (12) is disposed on surfaces of reflective elements (4) and the adhesive layer is laminated in direct contact with the mirror reflection layer (12). The cube corner retroreflection sheet and the retroreflection article according to this aspect do not require an air layer because they retroreflect on a specular reflection principle and therefore they do not require the binder layer and the support layer. The metal mirror reflection layer (12) disposed on the surfaces of the reflective elements (4) according to the invention may cover the entire area of the surfaces of the elements or part of them.

In the triangular pyramidal cube corner retroreflection sheet and the retroreflection article of the invention, it is possible to provide the mirror reflection layer (12) made of metal such as aluminum, copper, silver, and nickel on the surfaces of the retroreflection elements (4) by means of vacuum deposition, chemical plating, sputtering, or the like. Among the methods of providing the mirror reflection layer (12), the vacuum deposition using aluminum is preferable, because it is possible to suppress deposited temperature to thereby minimize thermal deformation of the retroreflection elements during the vapor deposition process and also because the obtained mirror reflection layer (12) has the lightest tone.

A continuous vapor deposition processing apparatus of the aluminum mirror reflection layer (12) is formed of a vacuum vessel that can maintain vacuum of about 7 to $9 \times 10^{-4}$ mmHg, an unreeling device for unreeling a prism raw sheet in the vessel and having two layers, i.e., a substrate sheet and a surface protecting layer laminated on a surface on a light incident side of the substrate sheet, a reeling device for reeling the prism raw sheet that has been subjected to vapor deposition, and a heating device disposed between them which can melt aluminum in a graphite crucible with an electric heater. Pure aluminum pellets of purity greater than or equal to 99.99% by weight are charged into the graphite crucible and melted under conditions of, for example, AC voltage of 350 to 360 V, electric current of 115 to 120 A, and processing speed of 30 to 70 m/minute to deposit the mirror reflection layer (12) 0.08 to 0.2 μm thick, for example, on the surfaces of the retroreflection elements by using vaporized aluminum atoms.

EXAMPLES

The invention will be described in further detail by way of the examples. It is needless to say that the invention is not limited only to the examples.

<Retroreflection Coefficient>

Retroreflection coefficients described in the present specification including those of the examples were measured by a method described below. By using "Model 920" manufactured by Gamma Scientific, retroreflection coefficients of a retroreflection sheet 100 mm per side were measured at given five positions according to a measuring method defined in ASTM E810-91 and under angle conditions of an observation angle of 0.2° and incident angles of 5°, 10°, 20°, 30°, 40°, and 50° and an average value was obtained as a retroreflection coefficient of the retroreflection sheet.

Example 1

On a copper sheet 100 mm per side with its surface made flat by cutting, a group of parallel grooves (x) at intervals of 207.269 μm, 100.0 μm in depth, having substantially symmetric V-shaped cross sections, and having straight-line bottom tracks was formed in a repeated pattern by cutting using a diamond bit having a tip end angle of 50.529°.

Then, a group of parallel V-shaped grooves (w1) having substantially symmetric V-shaped cross sections and having bent-line bottom tracks was formed by using a diamond bit having a symmetric cross sectional shape and a tip end angle of 79.505°. The parallel group (w1) of bent grooves in which each V-shaped groove was 100.0 μm deep and its bent lines shown as the side (A-D1) and the side (A-E2) in FIG. 5 were 225.357 μm long with a 133.775° intersection angle (∠D1-A-E2) was formed in a repeated pattern by cutting. An interval in a direction of the grooves x between the adjacent parallel V-shaped grooves (w1) was 265.385 μm and the bent portions were cut with a radius of curvature of 5 μm.

Furthermore, a group of parallel V-shaped grooves (w2) having substantially symmetric V-shaped cross sections and having bent-line bottom tracks was formed by using a similar diamond bit having a symmetric cross sectional shape and a tip end angle of 79.505°. The group of parallel bent grooves (w2) in which each V-shaped groove was 100.0 μm deep and its bent lines shown as the side (B-D2) and the side (B-E1) in FIG. 5 were 225.357 μm long with a 133.775° intersection angle (∠E1-B-D2) was formed in a repeated pattern by cutting. An interval in a direction of the grooves x between the adjacent parallel V-shaped grooves (w2) was 265.385 μm and the bent portions were cut with a radius of curvature of 5 μm. Moreover, the group of retroreflection elements according to the invention as shown in FIG. 6 was formed so that intervals in the direction of the grooves x between the group (w2) of parallel V-shaped grooves and the group (w1) of parallel V-shaped grooves were 44.231 μm and that the grooves in the groups were out of phase with each other by half a cycle.

In the pair of retroreflection elements formed as described above, a height (h) from the element vertex (H1 or H2) to the base plane was 100.0 μm, an inclination angle (θ) of an optic axis of the retroreflection element was +10.0°, and all vertex angles of three reflective side faces (faces a1, b1, c1, and faces a2, b2, c2) forming the reflective element were 90°. Moreover, the length s defined in FIG. 5 was 259.086 μm, r was 207.269 μm, and the ratio R was 0.80.

By using this brass matrix and by electroforming using a solution of 55% nickel sulfamate, a die for molding retroreflection elements, made of nickel, and having recessed inverted shapes was produced. By using this molding die, a 150-μm-thick polycarbonate resin sheet ("Lupilon H3000" manufactured by Mitsubishi Engineering-Plastics Corporation) was compression-molded under conditions of a molding temperature of 200° C. and molding pressure of 50 kg/cm². Then, the resin sheet was cooled to 30° C. under pressure and taken out. Thus, the retroreflection element sheet in the invention, made of polycarbonate resin and having, on its surface, a large number of retroreflection elements disposed in a close-packed state with a holding-body layer of about 100 μm thick was produced.

Example 2

Similarly to the example 1, on a copper sheet 100 mm per side with its surface made flat by cutting, a group (x) of parallel grooves at intervals of 155.452 μm, 100.0 μm in depth, having substantially symmetric V-shaped cross sections, and having straight-line bottom tracks was formed in a repeated pattern by cutting using a diamond bit having a tip end angle of 50.529°.

Then, a group (w1) of parallel V-shaped grooves having substantially symmetric V-shaped cross sections and having bent-line bottom tracks was formed by using a diamond bit having a symmetric cross sectional shape and a tip end angle of 79.505°. The group (w1) of parallel bent grooves in which each V-shaped groove was 100.0 μm deep and its bent lines shown as the side (A-D1) and the side (A-E2) in FIG. 8 were 169.018 μm long with a 133.775° intersection angle (∠D1-A-E2) was formed in a repeated pattern by cutting. An interval in a direction of the grooves x between the adjacent parallel V-shaped grooves (w1) was 309.616 μm and the bent portions were cut with a radius of curvature of 5 μm.

Furthermore, a group (w2) of parallel V-shaped grooves having substantially symmetric V-shaped cross sections and having bent-line bottom tracks was formed by using a similar diamond bit having a symmetric cross sectional shape and a tip end angle of 79.505°. The group of parallel bent grooves (w2) in which each V-shaped groove was 100.0 μm deep and its bent lines shown as the side (B-D2) and the side (B-E1) in FIG. 8 were 169.018 μm long with a 133.775° intersection angle (∠E1-B-D2) was formed in a repeated pattern by cutting. An interval in a direction of the grooves x between the adjacent parallel V-shaped grooves (w2) was 309.616 μm and the bent portions were cut with a radius of curvature of 5 μm. Moreover, the group of retroreflection elements according to the invention as shown in FIG. 9 was formed so that intervals in the direction of the grooves x between the parallel V-shaped grooves (w2) and the parallel V-shaped grooves (w1) were 88.462 μm and that the grooves in the groups were out of phase with each other by half a cycle.

In the pair of retroreflection elements formed as described above, a height (h) from the element vertex (H1 or H2) to the base plane was 100.0 μm, an inclination angle (θ) of an optic axis of the retroreflection element was +10.0°, and all vertex angles of three reflective side faces (faces a1, b1, c1, and faces a2, b2, c2) forming the reflective element were 90°. Moreover, the length s defined in FIG. 8 was 259.086 μm, r was 155.452 μm, and the ratio R was 0.60.

By using this matrix and by the same method as that in the example 1, the retroreflection element sheet in the invention, made of polycarbonate resin, and having a large number of retroreflection elements disposed in a close-packed state was produced.

Example 3

Similarly to the example 1, on a copper sheet 100 mm per side with its surface made flat by cutting, a group (x) of parallel grooves at intervals of 155.452 μm, 120.0 μm in depth, having substantially symmetric V-shaped cross sections, and having straight-line bottom tracks was formed in a repeated pattern by cutting using a diamond bit having a tip end angle of 50.529°.

Then, a group (w1) of parallel V-shaped grooves having substantially symmetric V-shaped cross sections and having bent-line bottom tracks was formed by using a diamond bit having a symmetric cross sectional shape and a tip end angle of 79.505°. The group (w1) of parallel bent grooves in which each V-shaped groove was 100.0 µm deep and its bent lines shown as the side (A-D1) and the side (A-E2) in FIG. 10 were 169.018 µm long with a 133.775° intersection angle (∠D1-A-E2) was formed in a repeated pattern by cutting. An interval in a direction of the grooves x between the adjacent parallel V-shaped grooves (w1) was 309.616 µm and the bent portions were cut with a radius of curvature of 10 µm.

Furthermore, a group (w2) of parallel V-shaped grooves having substantially symmetric V-shaped cross sections and having bent-line bottom tracks was formed by using a similar diamond bit having a symmetric cross sectional shape and a tip end angle of 79.505°. The group (w2) of parallel bent grooves in which each V-shaped groove was 100.0 µm deep and its bent lines shown as the side (B-D2) and the side (B-E1) in FIG. 10 were 169.018 µm long with a 133.775° intersection angle (∠E1-B-D2) was formed in a repeated pattern by cutting. An interval in a direction of the grooves x between the adjacent parallel V-shaped grooves (w2) was 309.616 µm and the bent portions were cut with a radius of curvature of 5 µm. Moreover, the group of retroreflection elements according to the invention as shown in FIG. 10 was formed so that intervals in the direction of the grooves x between the parallel V-shaped grooves (w2) and the parallel V-shaped grooves (w1) were 88.462 µm and that the grooves in the groups were out of phase with each other by half a cycle.

In the pair of retroreflection elements formed as described above, an inclination angle (θ) of an optic axis was +10.0° and all vertex angles of three reflective side faces (faces a1, b1, c1, and faces a2, b2, c2) forming the reflective element were 90°. Moreover, the length s defined in FIG. 10 was 259.086 µm, r was 155.452 µm, and the ratio R was 0.60.

By using this matrix and by the same method as that in the example 1, the retroreflection element sheet in the invention, made of polycarbonate resin, and having a large number of retroreflection elements disposed in a close-packed state was produced.

Example 4

Similarly to the example 1, on a copper sheet 100 mm per side with its surface made flat by cutting, a group (x) of parallel grooves disposed at intervals of 155.452 µm, 100.0 µm in depth, having V-shaped cross sections, and having straight-line bottom tracks was formed in a repeated pattern by cutting using a diamond bit having a tip end angle of 50.529° so that dG in FIG. 14 was 0.030.

Then, a group (w1) of parallel V-shaped grooves having V-shaped cross sections and having bent-line bottom tracks was formed by using a diamond bit having a tip end angle of 79.505°. The group (w1) of parallel bent grooves in which each V-shaped groove was 100.0 µm deep and its bent lines shown as the side (A-D1) and the side (A-E2) in FIG. 8 were 169.018 µm long with a 133.775° intersection angle (∠D1-A-E2) was formed in a repeated pattern by cutting so that dG in FIG. 14 was 0.03°. An interval in a direction of the grooves x between the adjacent parallel V-shaped grooves (w1) was 309.616 µm and the bent portions were cut with a radius of curvature of 5 µm.

Furthermore, a group (w2) of parallel V-shaped grooves having V-shaped cross sections and having bent-line bottom tracks was formed by using a diamond bit having a tip end angle of 79.505°. The group (w2) of parallel bent grooves in which each V-shaped groove was 100.0 µm deep and its bent lines shown as the side (B-D2) and the side (B-E1) in FIG. 8 were 169.018 µm long with a 133.775° intersection angle (∠E1-B-D2) was formed in a repeated pattern by cutting so that dG in FIG. 14 was 0.03°. An interval in a direction of the grooves x between the adjacent parallel V-shaped grooves (w2) was 309.616 µm and the bent portions were cut with a radius of curvature of 5 µm. Moreover, the group of retroreflection elements according to the invention as shown in FIG. 9 was formed so that intervals in the direction of the grooves x between the parallel V-shaped grooves (w2) and the parallel V-shaped grooves (w1) were 88.462 µm and that the grooves in the groups were out of phase with each other by half a cycle.

In the pair of retroreflection elements formed as described above, a height (h) from the element vertex (H1 or H2) to the base plane was 100.0 µm, an inclination angle (θ) of an optic axis of the retroreflection element was +10.0° and all vertex angles of three reflective side faces (faces a1, b1, c1, and faces a2, b2, c2) forming the reflective element were 90°. Moreover, the length s defined in FIG. 8 was 259.086 µm, r was 155.452 µm, and the ratio R was 0.60.

By using this matrix and by the same method as that in the example 1, the retroreflection element sheet in the invention, made of polycarbonate resin and having a large number of retroreflection elements disposed in a close-packed state was produced.

Example 5

Similarly to the example 1, on a copper sheet 100 mm per side and its surface made flat by cutting, a group (x) of parallel grooves at intervals of 155.452 µm, 100.0 µm in depth, having substantially symmetric V-shaped cross sections, and having straight-line bottom tracks was formed in a repeated pattern by cutting using a diamond bit having a tip end angle of 50.529°.

Then, a group (w1) of parallel V-shaped grooves having substantially symmetric V-shaped cross sections and having bent-line bottom tracks was formed by using a diamond bit having a symmetric cross sectional shape and a tip end angle of 79.505°. The group (w1) of parallel bent grooves in which each V-shaped groove was 100.0 µm deep and its bent lines shown as the side (A-D1) and the side (A-E2) in FIG. 8 were 169.018 µm long with a 133.775° intersection angle (∠D1-A-E2) was formed in a repeated pattern by cutting. An interval in a direction of the grooves x between the adjacent parallel V-shaped grooves (w1) was 309.616 µm and the bent portions were cut with a radius of curvature of 5 µm.

Furthermore, a group (w2) of parallel V-shaped grooves having substantially symmetric V-shaped cross sections and having bent-line bottom tracks was formed by using a similar diamond bit having a symmetric cross sectional shape and a tip end angle of 79.505°. The group (w2) of parallel bent grooves in which each V-shaped groove was 100.0 µm deep and its bent lines shown as the side (B-D2) and the side (B-E1) in FIG. 8 were 169.018 µm long with a 133.775° intersection angle (∠E1-B-D2) was formed in a repeated pattern by cutting. An interval in a direction of the grooves x between the adjacent parallel V-shaped grooves (w2) was 309.616 µm and the bent portions were cut with a radius of curvature of 5 µm. Moreover, the group of retroreflection elements according to the invention as shown in FIG. 9 was formed so that intervals in the direction of the grooves x between the parallel V-shaped grooves (w2) and the parallel V-shaped grooves (w1) were 88.462 μm and that the grooves in the groups were out of phase with each other by half a cycle. In this case, all the nonlinear factors fx, fy, and fz shown in FIG. 22 were 0.5 μm.

In the pair of retroreflection elements formed as described above, a height (h) from the element vertex (H1 or H2) to the base plane was 100.0 μm, an inclination angle (θ) of an optic axis of the retroreflection element was +10.0°, and all vertex angles of three reflective side faces (faces a1, b1, c1, and faces a2, b2, c2) forming the reflective element were 90°. Moreover, the length s defined in FIG. 8 was 259.086 μm, r was 155.452 μm, and the ratio R was 0.60.

By using this matrix and by the same method as that in the example 1, the retroreflection element sheet in the invention, made of polycarbonate resin, and having a large number of retroreflection elements disposed in a close-packed state was produced.

Example 6

Similarly to the example 1, on a copper sheet 100 mm per side with its surface made flat by cutting, a group (x) of parallel grooves at intervals of 126.796 μm, 100.0 μm in depth, having substantially symmetric V-shaped cross sections, and having straight-line bottom tracks was formed in a repeated pattern by cutting using a diamond bit having a tip end angle of 51.667°.

Then, a group (w1) of parallel V-shaped grooves having substantially symmetric V-shaped cross sections and having bent-line bottom tracks was formed. The group (w1) of parallel bent grooves was formed in a repeated pattern so that each V-shaped groove was 100.0 μm deep, a line segment (A-D1) in FIG. 23 was 135.669 μm long, a line segment (A-E2) was 141.700 μm long, an angle (∠D1-A-B) was 85.360°, and an angle (∠E2-A-B) was 72.611°.

Furthermore, a group (w2) of parallel V-shaped grooves having substantially symmetric V-shaped cross sections and having bent-line bottom tracks was formed. The group (w2) of parallel bent grooves was formed in a repeated pattern so that each V-shaped groove was 100.0 μm deep, a line segment (A-B) in FIG. 23 was 185.862 μm long, a line segment (B-E1) was 141.700 μm long, a line segment (B-D2) was 135.669 μm long, an angle (∠E1-B-A) was 72.611°, and an angle (∠D2-B-A) was 85.360°. In this manner, a matrix of the group of retroreflection elements according to the invention was produced.

In the group of retroreflection elements formed as described above, a height (h) from the element vertex (H1 or H2) to the base plane was 100.0 μm and all vertex angles of three reflective side faces (faces a1, b1, c1, and faces a2, b2, c2) forming the reflective element were 90°.

By using this matrix and by the same method as that in the example 1, the retroreflection element sheet in the invention, made of polycarbonate resin, and having a large number of retroreflection elements disposed in a close-packed state was produced.

Example 7

On a copper sheet 25 mm×100 mm per side with its surface made flat by cutting, a group (x) of parallel grooves at intervals of 155.452 μm, 100.0 μm in depth, having substantially symmetric V-shaped cross sections, and having straight-line bottom tracks was formed in a repeated pattern by cutting using a diamond bit having a tip end angle of 50.529°.

Then, parallel groups (w1) of V-shaped grooves having substantially symmetric V-shaped cross sections and having bent-line bottom tracks were formed by using a diamond bit having a symmetric cross sectional shape and a tip end angle of 79.505°. The group (w1) of parallel bent grooves in which each V-shaped groove was 100.0 μm deep and its bent lines shown as the side (A-D1) and the side (A-E2) in FIG. 8 were 169.018 μm long with a 133.775° intersection angle (∠D1-A-E2) was formed in a repeated pattern by cutting. An interval in a direction of the grooves x between the adjacent parallel V-shaped grooves (w1) was 309.616 μm and the bent portions were cut with a radius of curvature of 5 μm.

Furthermore, a group (w2) of parallel V-shaped grooves having substantially symmetric V-shaped cross sections and having bent-line bottom tracks was formed by using a similar diamond bit having a symmetric cross sectional shape and a tip end angle of 79.505°. The group (w2) of parallel bent grooves in which each V-shaped groove was 100.0 μm deep and its bent lines shown as the side (B-D2) and the side (B-E1) in FIG. 8 were 169.018 μm long with a 133.775° intersection angle (∠E1-B-D2) was formed in a repeated pattern by cutting. An interval in a direction of the grooves x between the adjacent parallel V-shaped grooves (w2) was 309.616 μm and the bent portions were cut with a radius of curvature of 5 μm. Moreover, the group of retroreflection elements according to the invention as shown in FIG. 9 was formed so that intervals in the direction of the grooves x between the parallel V-shaped grooves (w2) and the parallel V-shaped grooves (w1) were 88.462 μm and that the grooves in the groups were out of phase with each other by half a cycle.

In the pair of retroreflection elements formed as described above, a height (h) from the element vertex (H1 or H2) to the base plane was 100.0 μm, an inclination angle (θ) of an optic axis of the retroreflection element was +10.0°, and all vertex angles of three reflective side faces (face a1, b1, c1, and faces a2, b2, c2) forming the reflective element were 90°. Moreover, the length s defined in FIG. 8 was 259.086 μm, r was 155.452 μm, and the ratio R was 0.60 (referred to as a die A).

Then, similarly to the die A, on a copper sheet 25 mm×100 mm per side with its surface made flat by cutting, a group of pairs of elements in the same shapes as that formed on the die A was formed while turned 90° from the die A (referred to as a die B).

By combining the dies in an order of A, B, A, B, a matrix 100 mm per side was produced.

By using this matrix and by the same method as that in the example 1, the retroreflection element sheet in the invention, made of polycarbonate resin, and having a large number of retroreflection elements disposed in a close-packed state was produced.

Comparative Example

In the triangular pyramidal cube corner retroreflection elements shown in FIGS. 1 and 2, V-shaped grooves in directions x, y, and z were cut based on the following parameters and a triangular pyramidal cube corner retroreflection element sheet shown in FIGS. 1 and 2, made of polycarbonate resin, and having a large number of retroreflection elements disposed in a close-packed state was produced by the same method as in the example 1.

The parameters for cutting used for producing a matrix according to the above comparative example were as follows.

| | |
|---|---|
| Depth of V grooves in directions x, y, and z | 100.0 μm |
| Angle of V grooves in directions y and z | 79.505° |
| Angle of V groove in direction x | 50.529° |
| Pitch of V grooves in directions y and z | 203.403 μm |
| Pitch of V grooves in direction x | 259.086 μm |
| Intersection angle of V grooves between directions y and z | 46.225° |
| Intersection angle of V grooves between directions y, z, and x | 66.887° |
| Inclination angle of optic axis | +10.0° |

Retroreflection coefficients of the cube corner retroreflection sheets produced in the above examples 1 to 7 and the comparative example are shown in Table 1. The retroreflection coefficients of the retroreflection articles according to the examples 1 to 7 based on the invention were superior to the retroreflection coefficients of the triangular pyramidal cube corner retroreflection sheet according to the comparative example based on a conventional art in both the retroreflective property in the front direction of the sheet and the retrorefrectivity in a direction of a greater incident angle.

TABLE 1

| Observation angle | Incident angle | Example | | | | | | | Comparative example |
|---|---|---|---|---|---|---|---|---|---|
| | | 1 | 2 | 3 | 4 | 5 | 6 | 7 | |
| 0.2° | 5° | 724 | 682 | 756 | 505 | 534 | 598 | 611 | 636 |
| | 10° | 682 | 664 | 710 | 495 | 466 | 590 | 607 | 556 |
| | 20° | 575 | 600 | 630 | 447 | 434 | 512 | 525 | 380 |
| | 30° | 458 | 525 | 549 | 381 | 332 | 413 | 407 | 191 |
| | 40° | 288 | 336 | 366 | 237 | 230 | 293 | 250 | 149 |
| | 50° | 236 | 254 | 293 | 179 | 197 | 231 | 171 | 112 |

INDUSTRIAL APPLICABILITY

The retroreflection article according to the invention is a retroreflection article and a retroreflection sheet that can be used for traffic signs, construction signs, commercial signs, vehicle license plates, and the like as specific applications. Because the retroreflection article and sheet have the excellent entrance angularity, observation angularity, and rotation angularity, they have wide applications.

The invention claimed is:

1. A retroreflection article formed of groups of grooves in three directions having substantially V-shaped cross sections, including a large number of pairs of cube corner retroreflection elements being disposed, the elements in each pair being formed to be rotationally symmetric while sharing one base line forming the retroreflection elements, wherein a group of parallel V-shaped grooves in one direction (grooves x) forming the group of pairs of retroreflection elements has straight-line bottom tracks, the groups of parallel V-shaped grooves in the other two directions (grooves w1 and w2) have continuous bent-line bottom tracks bent at intersection points with the grooves x, the bottom tracks of the groups of parallel V-shaped grooves in the two directions (grooves w1 and w2) do not intersect with each other, and projection geometries of base planes (A-B-E1-D1 and A-B-E2-D2) forming the retroreflection elements are quadrilaterals.

2. The retroreflection article according to claim 1, wherein a height (hx) from vertexes (H1, H2) of the reflective elements to base lines of the V grooves of the group (x) of parallel V-shaped grooves having straight-line bottom tracks is different from a height (hw) from vertexes (H1, H2) of the retroreflection elements to base lines of the V grooves of the groups (w1 and w2) of parallel V-shaped grooves having bent-line bottom tracks, the groups of grooves forming the group of pairs of retroreflection elements.

3. The retroreflection article according to claim 2, wherein a ratio (hx/hw) between the height (hx) from vertexes (H1, H2) of the reflective elements to base lines of the V grooves of the group (x) of parallel V-shaped grooves having straight-line bottom tracks and the height (hw) from vertexes (H1, H2) of the retroreflection elements to base lines of the V grooves of the groups (w1 and w2) of parallel V-shaped grooves having bent-line bottom tracks is 1.05 to 1.4, the groups of grooves forming the group of pairs of retroreflection elements.

4. The retroreflection article according to either of claims 2 or 3, wherein a ratio (hx/hw) between the height (hx) from vertexes (H1, H2) of the reflective elements to base lines of the V grooves of the group (x) of parallel V-shaped grooves having straight-line bottom tracks and the height (hw) from vertexes (H1, H2) of the retroreflection elements to base lines of the V grooves of the groups (w1 and w2) of parallel V-shaped grooves having bent-line bottom tracks is 1.1 to 1.3, the groups of grooves forming the group of pairs of retroreflection elements.

5. The retroreflection article according to claim 4, wherein an inclination angle of an optic axis of the retroreflection element is plus (+) 3° or greater.

6. The retroreflection article according to claim 5, in which a distance between two base lines (A-B and E1-D1 or A-B and E2-D2) forming the quadrilateral base plane of the retroreflection element is r and a distance between an intersection point (C1 and C2) of extended lines of the other oblique sides (A-1, B-E1 and A-E2, B-D2) and the base line (A-B) is s, and a ratio (R) wherein R=r/s is 0.4 to 0.95.

7. The retroreflection article according to claim 1, wherein, in at least one of the groups of V-shaped grooves, a one-side groove angle is not equal to the other one-side groove angle of the V-shaped groove, the one-side groove being an angle between a line segment and a V groove vertical plane perpendicular to a common plane and including a base line of the V-shaped groove and the line segment being formed by an intersection of a plane perpendicular to both the common plane and the V groove vertical plane and a reflective side face including the base line of the V-shaped groove.

8. The retroreflection article according to claim 7, wherein a difference (dG) between the one one-side groove angle and the other one-side groove angle is 0.0001 to 0.1°.

9. The retroreflection article according to claim 7 or 8, wherein, in adjacent V-shaped grooves in at least one of the groups of parallel V-shaped grooves (grooves x, grooves w1, or grooves w2), at least two differences (dG) between the one-side groove angles are formed in a repeated pattern.

10. The retroreflection article according to claim 1, wherein, in at least one of the groups of V-shaped grooves, a one-side groove angle changes in one reflective side face and the one reflective side face forms a curved face and/or a plurality of planes, the one-side groove being an angle between a line segment and a V groove vertical plane perpendicular to a common plane and including a base line of the V-shaped groove and the line segment being formed by an intersection of a plane perpendicular to both the common plane and the V groove vertical plane and the reflective side face including the base line of the V-shaped groove.

11. The retroreflection article according to claim 10, wherein, in at least one reflective side face, the one-side groove angle has a maximum deviation of 0.0001 to 0.1° from a regular one-side groove angle forming a cube corner.

12. The retroreflection article according to claim 11, wherein a base line formed of bottom points of the V-shaped groove is a nonlinear base line that does not form a straight-line track.

13. The retroreflection article according to claim 12, wherein a nonlinear factor defined by a maximum distance between a point where a perpendicular line and the nonlinear base line intersect with each other and an opposite-end straight line connecting opposite ends of the nonlinear base line is 0.0001L to 0.05L where L is a length of the opposite-end straight line, the perpendicular line being from the opposite-end straight line to the nonlinear base line.

14. The retroreflection article according to any one of claims 10-13, wherein an inclination angle of an optic axis of the retroreflection element is plus (+) 5° to 20°.

15. The retroreflection article according to claim 14, in which a distance between two base lines (A-B and E1-D1 or A-B and E2-D2) forming the quadrilateral base plane of the retroreflection element is r and a distance between an intersection point (C1 and C2) of extended lines of the other oblique sides (A-D1, B-E1 and A-E2, B-D2) and the base line (A-B) is s, and a ratio (R) wherein R=r/s is 0.5 to 0.9.

16. The retroreflection article according to claim 1, wherein rA1, rB1, and rC1 are substantially different from each other where rA1 is an angle between CI-A and A-B, rB1 is an angle between A-B and B-C1, and rC1 is an angle between B-C1 and C1-A.

17. The retroreflection article according to claim 16, wherein the three internal angles rA1, rB1, and rC1 of the retroreflection element are substantially different from each other and an internal angle rmax that is the largest internal angle among the three internal angles rA1, rB1, and rC1 is 63°<rmax<88°.

18. The retroreflection article according to claim 1, wherein the group of pairs of elements includes a combination of a first zone and a second zone and an angle between a line x1 and a line x2 is 5 to 175° where the groups of V-shaped grooves in the direction x in the first zone are the lines x1 and the groups of V-shaped grooves in the direction x in the second zone are the lines x2.

19. The retroreflection article according to claim 18, wherein the angle between the line x1 and the line x2 is 80 to 100°.

20. The retroreflection article according to any one of claims 16-19, wherein an inclination angle of an optic axis of the retroreflection element is plus (+) 7° to 12°.

* * * * *

UNITED STATES PATENT AND TRADEMARK OFFICE
CERTIFICATE OF CORRECTION

| | |
|---|---|
| PATENT NO. | : 8,201,953 B2 |
| APPLICATION NO. | : 12/303257 |
| DATED | : June 19, 2012 |
| INVENTOR(S) | : Ikuo Mimura |

It is certified that error appears in the above-identified patent and that said Letters Patent is hereby corrected as shown below:

COLUMN 1:

Line 60, "as a 1/10 inch" should read --as 1/10 inch--.

COLUMN 5:

Line 38, "groups two" should read --groups of two--; and
Line 67, "GLW1" should read --GLw1--.

COLUMN 11:

Line 67, "ments" should read --ment--.

COLUMN 12:

Line 7, "one vertexes" should read --one vertex--; and
Line 22, "distance is" should read --distance s is--.

COLUMN 13:

Line 5, "one vertexes" should read --one vertex--;
Line 19, "is 0.6" should read --is 0.6.--;
Line 30, "one vertexes" should read --one vertex--; and
Line 51, "one vertexes" should read --one vertex--.

COLUMN 14:

Line 4, "(GRx) in FIG." should read --GRx). In FIG.--;
Line 11, "retrorefrectivity" should read --retroreflectivity--; and Signed and Sealed this
Eleventh Day of September, 2012

David J. Kappos
*Director of the United States Patent and Trademark Office*

Line 19, "on to" should read --onto--.

COLUMN 15:

Line 17, "(angle; q)" should read --angle: η--; and
Line 25, "angle" should read --angle"--.

COLUMN 17:

Line 62, "retrorefrectivity" should read --retroreflectivity--.

COLUMN 18:

Line 37, "retrorefrectivity" should read --retroreflectivity--.

COLUMN 20:

Line 37, "resin Examples" should read --resin. Examples--.

COLUMN 21:

Line 24, "one of objects" should read --one of the objects--.

COLUMN 25:

Line 55, "0.030." should read --0.03°.--.

COLUMN 29:

Line 20, "retrorefrec-" should read --retroreflec- --.

COLUMN 32:

Line 1, "CI-A" should read --C1-A--; and
Line 9, "63°<rmax<88°." should read --63°≤rmax≤88°.--.